United States Patent
Jacobson et al.

(10) Patent No.: US 8,146,421 B2
(45) Date of Patent: Apr. 3, 2012

(54) METHOD AND APPARATUS FOR SENSING LEVELS OF INSOLUBLE FLUIDS

(75) Inventors: Lucas Jacobson, Rowlett, TX (US); James Perkins, Oklahoma City, OK (US); Lorin Jacobson, Pauls Valley, OK (US); Patrick Williams, Oklahoma City, OK (US)

(73) Assignee: Pulstone Technologies, LLC, Pauls Valley, OK (US)

( * ) Notice: Subject to any disclaimer, the term of this patent is extended or adjusted under 35 U.S.C. 154(b) by 513 days.

(21) Appl. No.: 12/367,074

(22) Filed: Feb. 6, 2009

(65) Prior Publication Data

US 2009/0199635 A1    Aug. 13, 2009

Related U.S. Application Data

(60) Provisional application No. 61/027,229, filed on Feb. 8, 2008.

(51) Int. Cl.
    *G01F 23/26* (2006.01)
(52) U.S. Cl. .................................................. 73/304 C
(58) Field of Classification Search ................. 73/304 C
    See application file for complete search history.

(56) References Cited

U.S. PATENT DOCUMENTS

| | | | |
|---|---|---|---|
| 3,639,835 A | 2/1972 | Damming, Jr. et al. | |
| 3,952,593 A | 4/1976 | Ells | |
| 4,074,184 A | 2/1978 | Dechene et al. | |
| 4,663,775 A * | 5/1987 | Olek | 379/24 |
| 4,674,329 A * | 6/1987 | Mulder | 73/304 C |
| 4,806,847 A * | 2/1989 | Atherton et al. | 73/304 C |
| 5,005,407 A | 4/1991 | Koon | |
| 5,042,299 A | 8/1991 | Wells | |
| 6,880,397 B2 | 4/2005 | Thomason | |

FOREIGN PATENT DOCUMENTS

WO    9817981    4/1998

* cited by examiner

*Primary Examiner* — Hezron E Williams
*Assistant Examiner* — Paul West
(74) *Attorney, Agent, or Firm* — Head, Johnson & Kachigian, P.C.

(57) ABSTRACT

A method and apparatus for sensing levels of insoluble fluids within a storage vessel utilizing an array of main capacitive sensors having differing geometries. The array of main capacitive sensors gives the ability to measure the levels of insoluble liquids in a vessel. Each of the main capacitive sensors include at least one pair of conductive plates capable of submersion in the at least two insoluble fluids, and the geometries of the pair of conductive plates differ and are distinct, such as in distance or in width, in each of the main capacitive sensors. In addition, the apparatus and method may include at least one reference sensor placed intermittently along the height of the vessel to provide input as to the permittivities of the insoluble fluids.

19 Claims, 15 Drawing Sheets

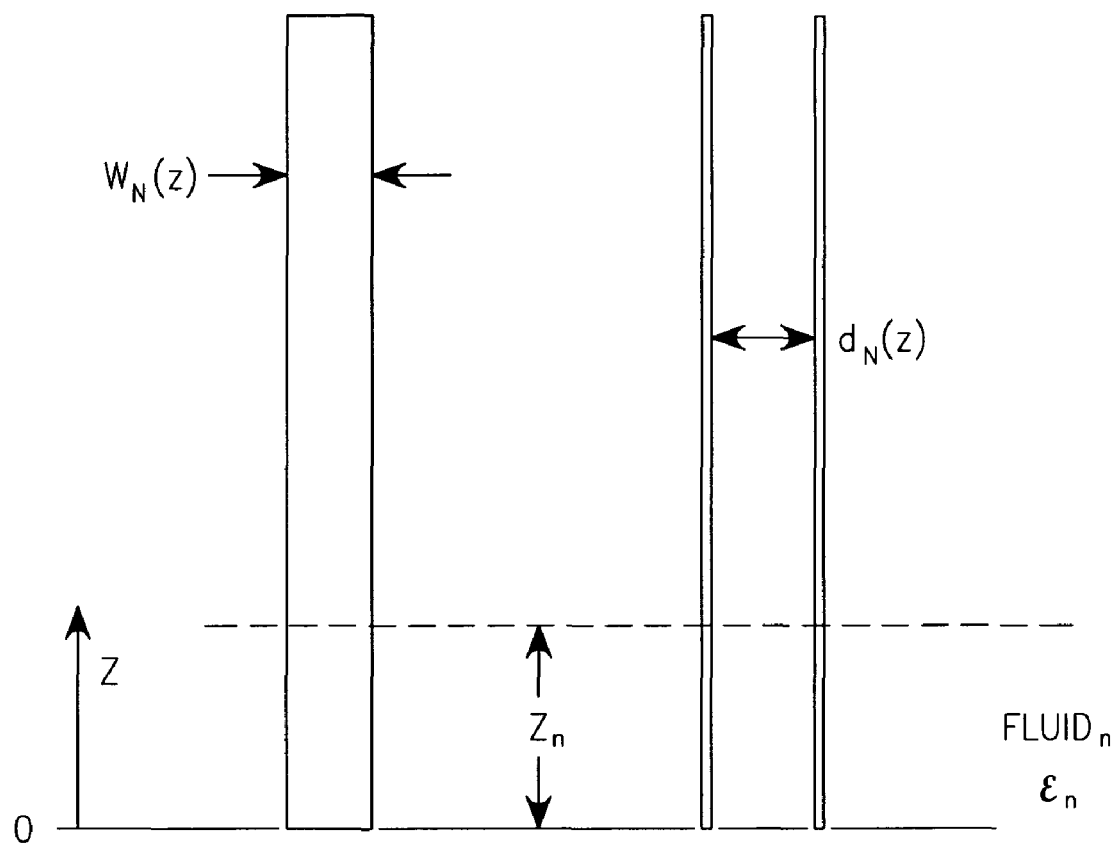
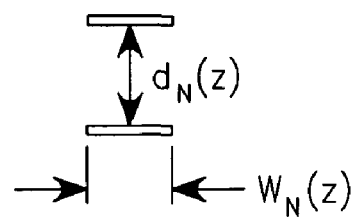
FIG. 1
*PRIOR ART*

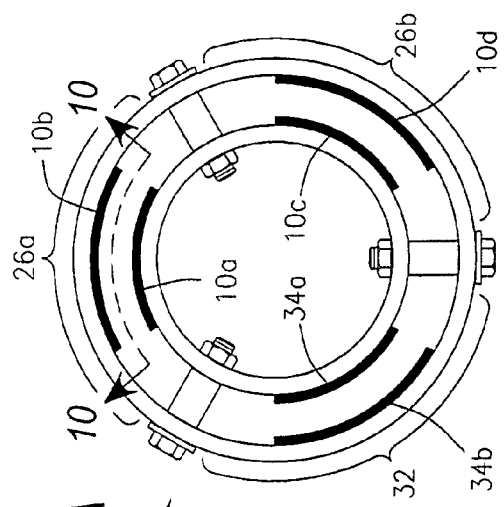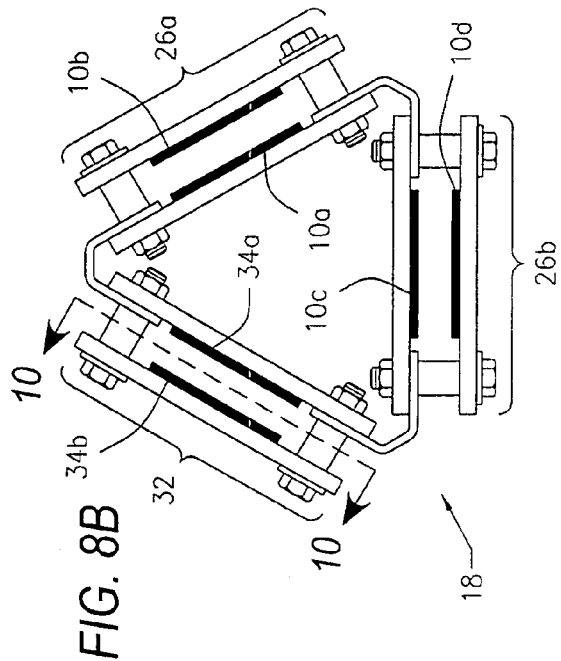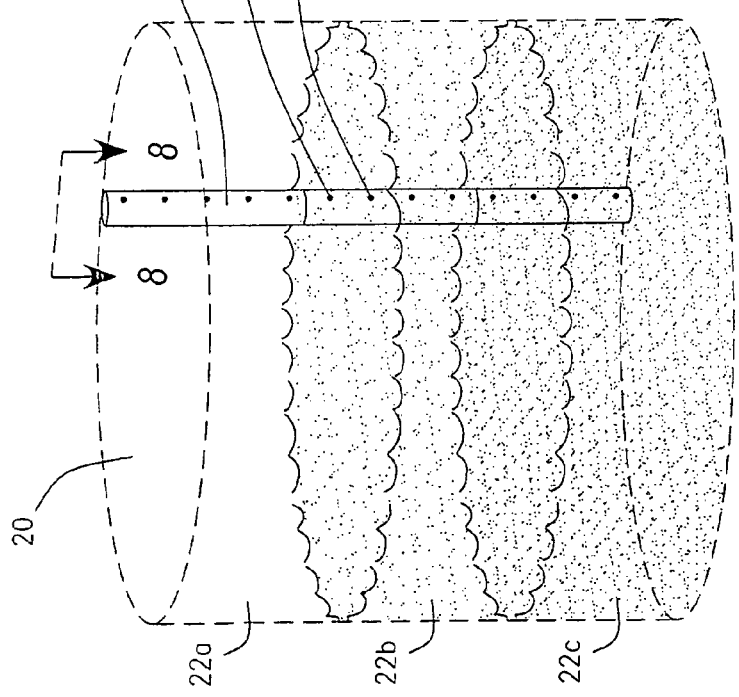

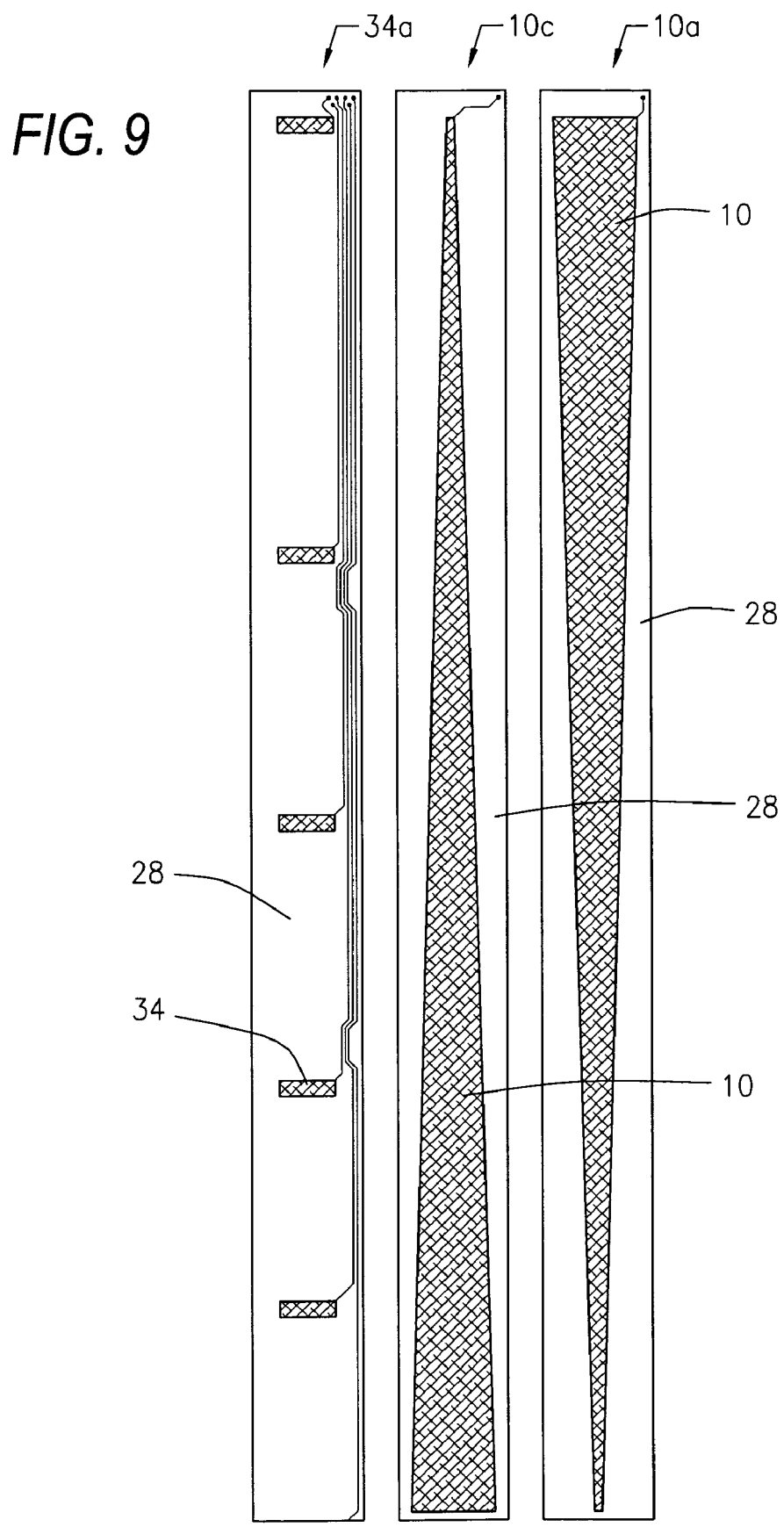

METHOD AND APPARATUS FOR SENSING LEVELS OF INSOLUBLE FLUIDS

CROSS-REFERENCE TO RELATED APPLICATIONS

This application claims priority to U.S. Provisional Application Ser. No. 61/027,229, filed Feb. 8, 2008, which is incorporated herein by reference.

BACKGROUND OF THE INVENTION

1. Field of the Invention

This invention relates generally to fluid level sensors, and more particularly to a method and apparatus for sensing levels of insoluble fluids, including but not limited to crude oil and water, in a vessel.

2. Description of the Related Art

Devices for measuring and monitoring the fluid level in a storage vessel or tank typically are arrangements that include a sensing element or apparatus immersed in the fluid or other medium within the vessel. Many of the fluid level sensors require the fluid to be measured be in electrical contact with the gauge or require the material to be electrically conductive.

Typical devices for monitoring a fluid level in a tank or other storage vessel operate by means of an electromechanical switch that is activated by a float. The float or floats ride on the surface of the fluid, and when the fluid reaches a predetermined level, a switch coupled to the float is activated. These types of floats and similar devices are undesirable because they are prone to sticking in either the on or off position. Other types of floats rely on a signal indicating a change in the position of the float in the vessel, which must be read each time a measurement is to be taken. This type of signal float provides a span of measurements, unlike floats coupled to a switch. However, construction of these signal floats is expensive and the floats must have a certain density in order to float on the water, but not the oil. In addition, like the floats coupled to a switch, these signal floats have a tendency of sticking. Furthermore, these signal floats require specific electrical geometries, which does not allow for a realizable system of modularity.

Other known fluid level sensors utilize capacitive sensors that are directly immersed into the fluid to be measured. These capacitive sensors are subject to changes in dielectric constant. These capacitive sensors only sense the level of a single fluid and air. When these capacitive sensors are used to measure the level of multiple fluids, they determine one (1) capacitive measurement, and therefore, there are an infinite number of solutions available if there is more than one (1) unknown fluid height.

It is therefore desirable to provide a method and apparatus for sensing levels of insoluble fluids stored in a vessel.

It is further desirable to provide a method and apparatus for sensing levels of insoluble fluids that overcomes the limitations of the prior art and yet is sufficiently accurate in the measurement of the individual fluids within the storage vessel.

It is yet further desirable to provide a method and apparatus for sensing levels of insoluble fluids that requires no moving parts for sensing the level of two or more insoluble fluids.

BRIEF SUMMARY OF THE INVENTION

In general, the invention relates to a method and apparatus for measuring the level of a plurality of insoluble fluids within a storage vessel. The apparatus for sensing levels of at least two insoluble fluids includes at least two main capacitive sensors. Each of the main capacitive sensors includes at least one pair of conductive sensor plates capable of submersion in the insoluble fluids. The geometries either in distance between the conductive plates or with width of the conductive plates are distinct in each of the main capacitive sensors. The conductive plates may be in substantially vertical alignment. The insoluble fluids may include crude oil and water, milk and cream, fresh water and brine, inorganic and organic fluids, or polar and non-polar fluids, and at least one of the insoluble fluids may be air. The main capacitive sensors that measure the insoluble fluids that are not air have differing and distinct geometries. The method and apparatus may further include at least one reference sensor placed intermittently along the height of the vessel to provide input as to the permittivities of the insoluble fluids.

BRIEF DESCRIPTION OF THE DRAWINGS

FIG. 1 is a perspective representation of known capacitive methods for measuring the level of a single fluid with a single capacitor;

FIG. 7 is a cutaway view of an example of a main capacitive sensor array submerged in three (3) insoluble fluids within a vessel in accordance with an illustrative embodiment of the method and apparatus for sensing levels of insoluble fluids disclosed herein;

FIGS. 8A and 8B are cross-section views along line 8-8 of examples of main capacitive sensor arrays in accordance with illustrative embodiments of the method and apparatus for sensing levels of insoluble fluids disclosed herein;

FIG. 9 is a plan view of an example of conductive plates, which when associated with a mirrored set of conductive plates form an array of main capacitive sensors, each having differing geometries, and a reference plate of a reference sensor in accordance with illustrative embodiments of the method and apparatus for sensing levels of insoluble fluids disclosed herein;

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Referring to the figures of the drawings, wherein like numerals of reference designate like elements throughout the several views, and initially to FIG. 1 and as described in the description of related art, electrode configurations have been well documented and used extensively. The electrodes may be in the form of concentrically spaced tubes or may be spaced parallel plates, as shown in FIG. 1. These electrode plates are placed within the vessel having the fluid to be measured. The electrode plates are placed in the fluid such that the fluid level rises on the electrodes from a minimum point, such as when the vessel is empty, to a maximum point, such as when the vessel is full. When the vessel is empty, there is no fluid contacting or between the electrodes, only air. When the vessel is full, the electrodes are fully submersed and the fluid is fully in contact with and between the electrodes. In this situation, the capacitance measured by the capacitor depends upon the dielectric constants of the combination of the fluids, including air.

Referring still to FIG. 1 illustrating a single fluid, single capacitor, the electrode plates of the capacitor are separated by a distance (d), the electrode plates of the capacitor have a width (w), and thus area (A) equals the interacting area between the two electrode plates. The dielectric constants $(\epsilon_o)$ and the relative permittivities $(\epsilon_R)$ of the fluids within the vessel, one being air, are physical constants and material properties, respectively. The capacitance (C) between the two plates is described by the equation:

$$C = \epsilon_0 \epsilon_R \frac{A}{d} \quad \text{(Equation 1)}$$

As one of the fluids displaces another between the two conductive plates of the capacitor, the capacitance changes and the level (z) of the fluid can be deduced.

Figure 2:
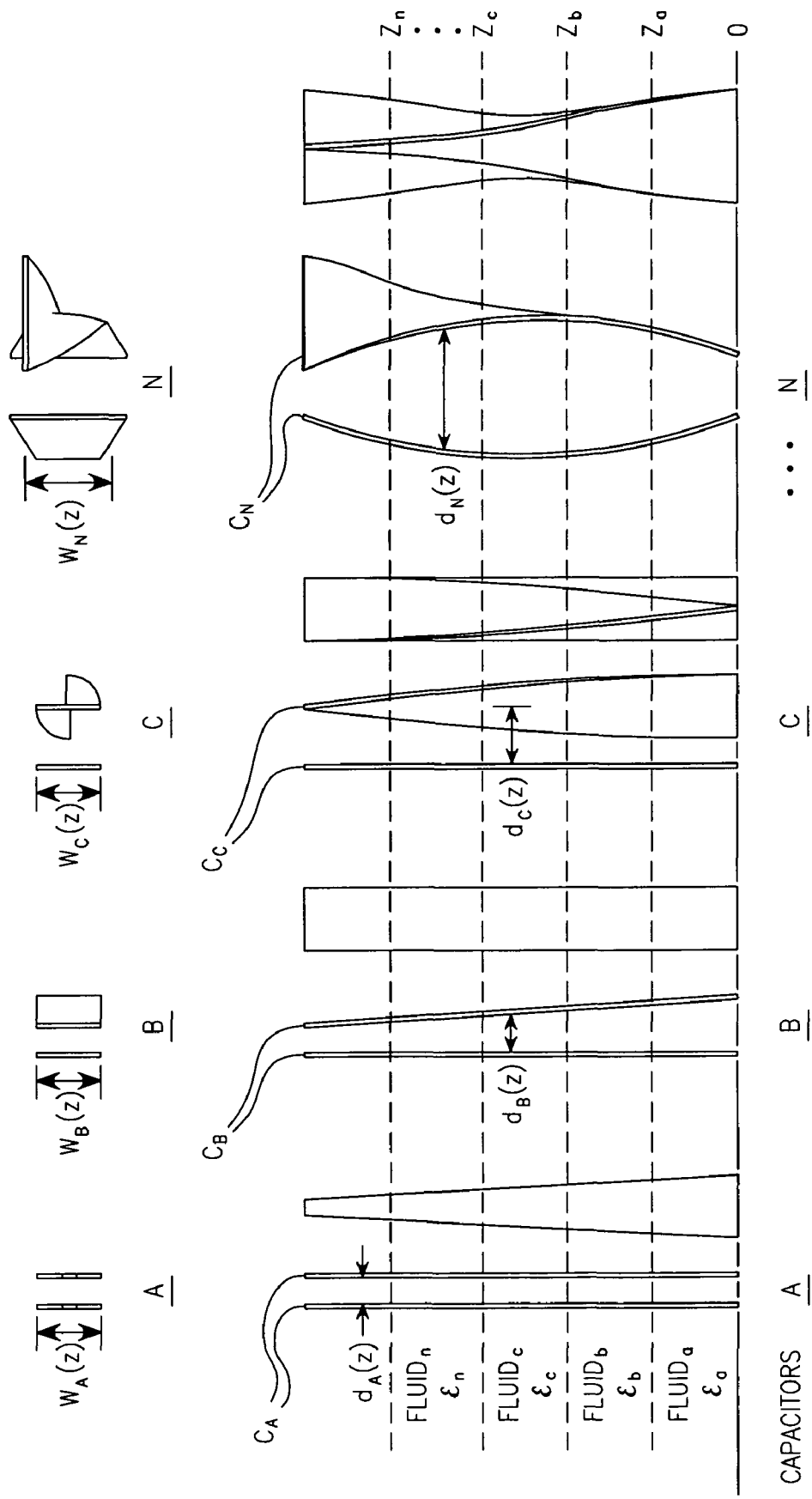
FIG. 2 is a perspective representation of examples of apparatuses for sensing levels of multiple insoluble fluids with multiple main capacitive sensors in accordance with illustrative embodiments of the method and apparatus for sensing levels of insoluble fluids disclosed herein.

The method and apparatus for sensing levels of insoluble and/or separated fluids disclosed herein is generally illustrated in FIG. 2. The method and apparatus are based on the fact that different fluids have different dielectric constants and will therefore produce different values of capacitance when placed between two conductive sensor plates. The apparatus includes at least two main capacitive sensors, with each sensor having a mirrored-pair of conductive, sensor plates capable of being submerged into the insoluble fluids. The number of main capacitive sensors depends and is directly related to the number of insoluble fluids to be measured. The geometries of the conductive plates in one particular capacitive sensor are mirror images, while the geometries of the conductive plates differ in each of the separate capacitive sensors.

For purposes of exemplification, Equation 2 below is provided to describe the relationship between geometries of the conductive plates as well as a specific solution, which has been developed to equalize tradeoffs from a manufacturing, measurement, and cost perspective for the case of a volume containing three (3) fluids of which the height of two (2) are unknown (air, oil, and water).

Again the general Equation 2 below is for descriptive purposes to show the relationships between the necessary conductive plate geometries and are shown based the Cartesian coordinate system (such as shown in FIG. 8B). The method and apparatus for sensing levels of insoluble fluid disclosed herein may be used with other coordinate systems, such as a cylindrical system, should the conductive plates of the capacitive sensor be wrapped around an axis (such as shown in FIG. 8A). However, since any geometry can be represented by equivalent functions in all real coordinate systems, the Cartesian has been chosen for ease of conceptual understanding. For purposes of discussions below and as illustrated in FIG. 2, the x-axis falls on the line parallel to both the ground and one plate, the y-axis falls on the line parallel to ground and perpendicular to the x-axis, and the z-axis is perpendicular to both the x-axis and the y-axis and is the axis that the fluid heights traverse.

The following variables are used in the general Equation 2 below for purposes of illustrating the necessary relationships of the method and apparatus for sensing levels of insoluble fluids disclosed herein:

C=the capacitance measured on one conductive plate pair whether sharing a common ground plate with another main capacitive sensor or not;

w(x,y,z)=descriptive function of the width of the conductive plates of a main capacitive sensor. The width may vary with z directly or could also vary alongside a change in x or y, which must change as a function of z, and thereby allowing one of the conductive plates to include a twist. In most cases, however, y is a constant, and width w is noted as a function of both variables;

d(x,y,z)=descriptive function of the distance between the complementary, conductive plates of the main capacitive sensor. The distance may vary with either z directly or vary alongside a change in x or y, which are dependent upon change as a function of z. Even though y is constant in most cases, a change in y would give the ability to give one of the conductive plates a twisting configuration. Distance d is therefore noted as a function of both variables;

The epsilon value ($\epsilon_o$) represents the dielectric constant, while the epsilon values ($\epsilon_a, \epsilon_b, \ldots \epsilon_n$) represent the permittivity of the fluids in question;

The integrals taken of the w functions provide the area (A) of the main capacitive sensor encompassed by each fluid as it is denoted; and The integrals taken of the d functions divided by the length of the definite integral taken provide the average distance between the conductive plates of the main capacitive sensor for the height (z) of the fluid in question.

By having an array of main capacitive sensors that has the properties described by the following equations, the main capacitive sensor described herein allows the levels of the individual fluids to be determined with known dimensions of each sensor.

$$C_A = \epsilon_0 \epsilon_a \frac{\int_0^{z_a} w_A(x,y,z)\,dz}{\left[\frac{\int_0^{z_a} d_A(x,y,z)\,dz}{z_a}\right]} + \epsilon_0 \epsilon_b \frac{\int_{z_a}^{z_b} w_A(x,y,z)\,dz}{\left[\frac{\int_{z_a}^{z_b} d_A(x,y,z)\,dz}{z_b - z_a}\right]} +$$

$$\epsilon_0 \epsilon_c \frac{\int_{z_b}^{z_c} w_A(x,y,z)\,dz}{\left[\frac{\int_{z_b}^{z_c} d_A(x,y,z)\,dz}{z_c - z_b}\right]} \ldots \epsilon_0 \epsilon_n \frac{\int_{z_{n-1}}^{z_n} w_A(x,y,z)\,dz}{\left[\frac{\int_{z_{n-1}}^{z_n} d_A(x,y,z)\,dz}{z_n - z_{n-1}}\right]}$$

$$C_B = \epsilon_0 \epsilon_a \frac{\int_0^{z_a} w_B(x,y,z)\,dz}{\left[\frac{\int_0^{z_a} d_B(x,y,z)\,dz}{z_a}\right]} + \epsilon_0 \epsilon_b \frac{\int_{z_a}^{z_b} w_B(x,y,z)\,dz}{\left[\frac{\int_{z_a}^{z_b} d_B(x,y,z)\,dz}{z_b - z_a}\right]} +$$

$$\epsilon_0 \epsilon_c \frac{\int_{z_b}^{z_c} w_B(x,y,z)\,dz}{\left[\frac{\int_{z_b}^{z_c} d_B(x,y,z)\,dz}{z_c - z_b}\right]} \ldots$$

$$\epsilon_0 \epsilon_n \frac{\int_{z_{n-1}}^{z_n} w_B(x,y,z)\,dz}{\left[\frac{\int_{z_{n-1}}^{z_n} d_B(x,y,z)\,dz}{z_n - z_{n-1}}\right]}$$

$$C_C = \epsilon_0 \epsilon_a \frac{\int_0^{z_a} w_C(x,y,z)\,dz}{\left[\frac{\int_0^{z_a} d_C(x,y,z)\,dz}{z_a}\right]} + \epsilon_0 \epsilon_b \frac{\int_{z_a}^{z_b} w_C(x,y,z)\,dz}{\left[\frac{\int_{z_a}^{z_b} d_C(x,y,z)\,dz}{z_b - z_a}\right]} +$$

$$\epsilon_0 \epsilon_c \frac{\int_{z_b}^{z_c} w_C(x,y,z)\,dz}{\left[\frac{\int_{z_b}^{z_c} d_C(x,y,z)\,dz}{z_c - z_b}\right]} \ldots$$

(Equation 2)

$$\epsilon_0 \epsilon_n \frac{\int_{z_{n-1}}^{z_n} w_C(x,y,z)\,dz}{\left[\frac{\int_{z_{n-1}}^{z_n} d_C(x,y,z)\,dz}{z_n - z_{n-1}}\right]}$$

$$\vdots$$

$$C_N = \epsilon_0 \epsilon_a \frac{\int_0^{z_a} w_N(x,y,z)\,dz}{\left[\frac{\int_0^{z_a} d_N(x,y,z)\,dz}{z_a}\right]} +$$

$$\epsilon_0 \epsilon_b \frac{\int_{z_a}^{z_b} w_N(x,y,z)\,dz}{\left[\frac{\int_{z_a}^{z_b} d_N(x,y,z)\,dz}{z_b - z_a}\right]} +$$

$$\epsilon_0 \epsilon_c \frac{\int_{z_b}^{z_c} w_N(x,y,z)\,dz}{\left[\frac{\int_{z_b}^{z_c} d_N(x,y,z)\,dz}{z_c - z_b}\right]} \ldots$$

$$\epsilon_0 \epsilon_n \frac{\int_{z_{n-1}}^{z_n} w_N(x,y,z)\,dz}{\left[\frac{\int_{z_{n-1}}^{z_n} d_N(x,y,z)\,dz}{z_n - z_{n-1}}\right]}$$

where w(x,y,z) describes the width of the conductive plates of the main capacitive sensor. By taking the integral of the width over the length of the conductive plates of the main capacitive sensor that each fluid acts upon, the area of the main capacitive sensor interfacing to the fluid is calculated (Equation 3 below). By integrating the distance function over the length of the main capacitive sensor that each fluid acts upon and dividing by the magnitude of this length, the average distance for the fluid is calculated. $\epsilon_0$ equals the permittivity of free space in a vacuum or approximates air at low pressures, such as 8.854×10^−12 F/m, and $\epsilon_n$ equals the dielectric constant of each fluid in the vessel to be measured. The dielectric constant is the electric property of each fluid that allows the capacitive sensor to distinguish between the different fluids. C describes the capacitance measured by each main capacitive sensor in the array. The number of fluids (counting air as one fluid) can then be measured by this apparatus and method, provided the following constraints are true:

N>=n AND ($w_A(x,y,z) \neq C^* w_B(x,y,z) \neq D^* w_C(x,y,z) \neq \ldots \neq E^* w_N(x,y,z)$ for all real C, D, and E AND/OR $d_A(x,y,z) \neq F^* d_B(x,y,z) \neq G^* d_C(x,y,z) \neq \ldots \neq H^* d_N(x,y,z)$ for all real F, G, and H so that $w_A(x,y,z), w_B(x,y,z), w_C(x,y,z), \ldots w_N(x,y,z)$ are independent equations, and $d_A(x,y,z), d_B(x,y,z), d_C(x,y,z), \ldots d_N(x,y,z)$ are independent equations.

Figure 3A:
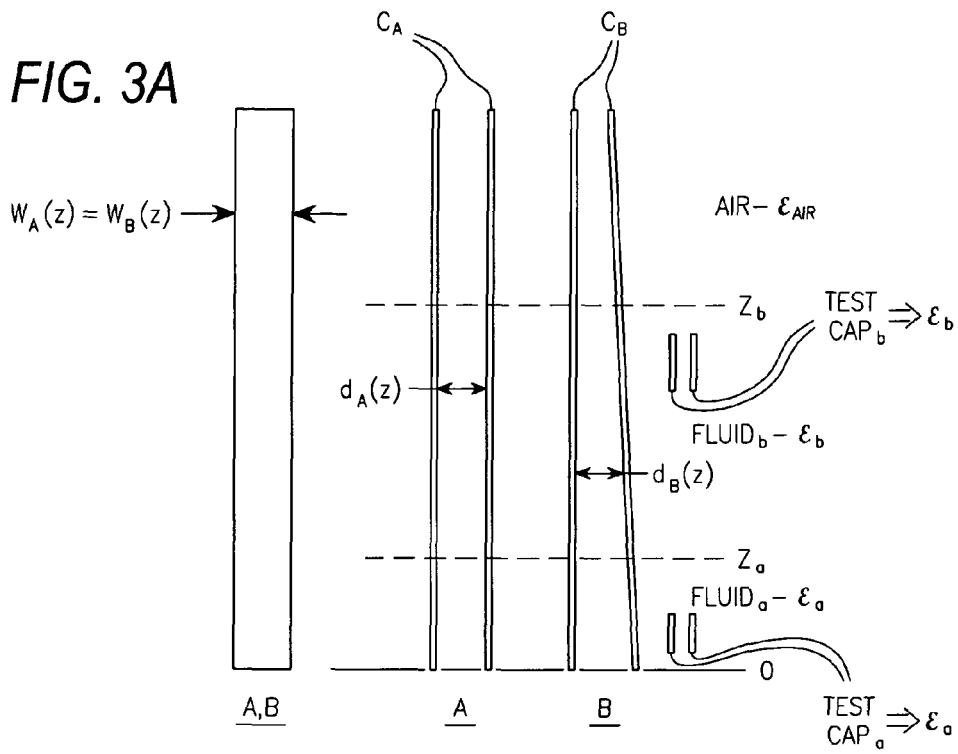
FIGS. 3a and 3b are perspective representations of examples of an apparatus for sensing the level of two insoluble fluids with main capacitive sensors in accordance with illustrative embodiments of the method and apparatus for sensing levels of insoluble fluids disclosed herein.
Figure 3B:
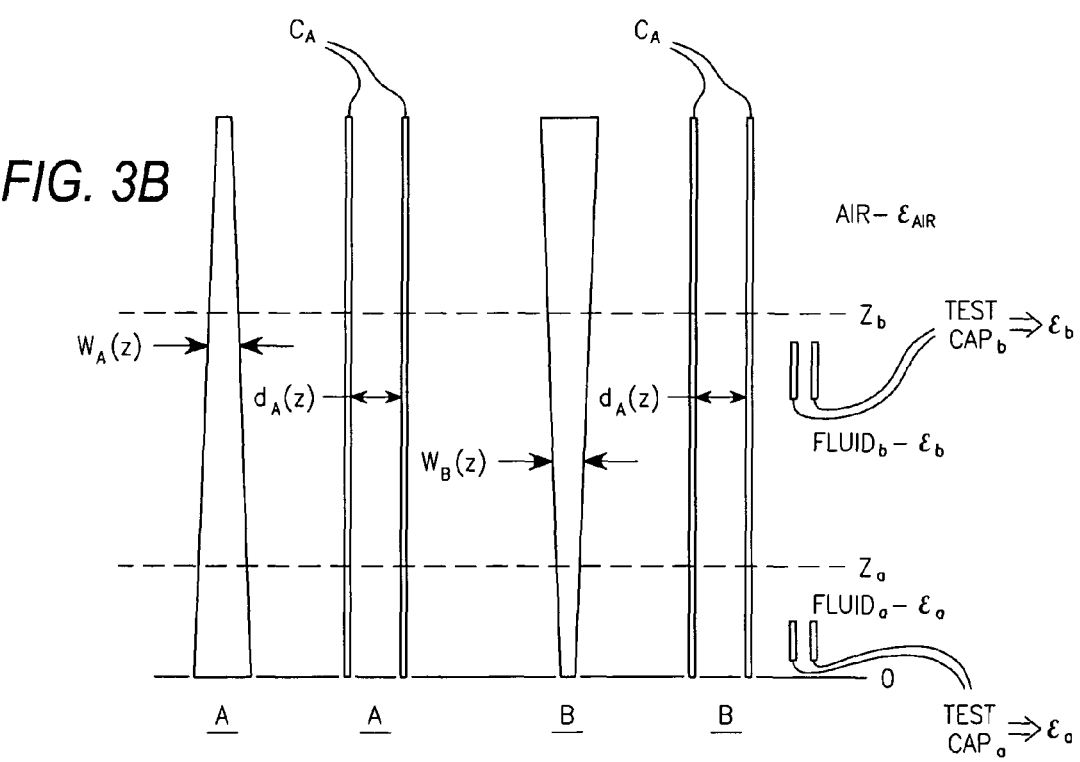

Due to the difficulty in the oil field industry to accurately and safely measure storage vessel inventory, and in particular crude oil, the method and apparatus for sensing levels of insoluble fluids disclosed herein uses at least two main capacitive sensors that may vary at least with respect to d(x,y,z) (Equation 3a) or w(x,y,z) (Equation 3b). Referring to FIGS. 3a and 3b, the main capacitive sensor array gives the ability to measure the levels of water and oil in the vessel, with air being the third fluid so that the equations Capacitors N>=n and number fluids=n.

The equations for the capacitance of the main capacitive sensors for the method and apparatus for sensing levels of insoluble fluids disclosed herein are as follows when the main capacitive sensors are varied with respect to d(x,y,z) are as follows:

$$C_A = \frac{w}{d}(x_a \varepsilon_a + (x_b - x_a)\varepsilon_b + (h - x_b)\varepsilon_{AIR})$$ (Equation 3a)

$$C_B = w \left( \frac{x_a \varepsilon_a}{\frac{x_a(d_{top} - d_{bottom})}{2h} + d_{bottom}} + \frac{(x_b - x_a)\varepsilon_b}{\frac{(x_b + x_a)(d_{top} - d_{bottom})}{2h} + d_{bottom}} + \frac{(h - x_b)\varepsilon_{AIR}}{\frac{(h + x_b)(d_{top} - d_{bottom})}{2h} + d_{bottom}} \right)$$

Alternatively, the equations for the capacitance of the main capacitive sensors when varied with respect to w(x,y,z), assuming Capacitance of main capacitive sensor A is a trapezoid with apex toward the bottom and Capacitance of main capacitive sensor B is a trapezoid with apex toward the top are as follows:

$$C_A = \frac{1}{d} \left\{ \varepsilon_a z_a \left[ \frac{z_a(w_{top} - w_{bottom})}{2h} + w_{bottom} \right] + \varepsilon_b (z_b - z_a) \left[ \frac{(z_b + z_a)(w_{top} - w_{bottom})}{2h} + w_{bottom} \right] + \varepsilon_{air}(h - z_b) \left[ \frac{(h + z_b)(w_{top} - w_{bottom})}{2h} + w_{bottom} \right] \right\}$$ (Equation 3b)

$$C_B = \frac{1}{d} \left\{ \varepsilon_a z_a \left[ \frac{z_a(w_{bottom} - w_{top})}{2h} + w_{top} \right] + \varepsilon_b (z_b - z_a) \left[ \frac{(z_b + z_a)(w_{bottom} - w_{top})}{2h} + w_{top} \right] + \varepsilon_{air}(h - z_b) \left[ \frac{(h + z_b)(w_{bottom} - w_{top})}{2h} + w_{top} \right] \right\}$$

The idealized Equation 4 below describes the capacitance between two conductive plates of a main capacitive sensor.

$$C = permitivity * \frac{Area}{dist}$$ (Equation 4)

For Equation 4 to be true, Area >>dist. Equation 4 is idealized because the flux between the two conductive plates of the main capacitive sensor is not completely perpendicular. The closer the angle between the two conductive plates is to zero (0) and the closer they are together with regard to the Area of the conductive plates, the closer they will come to be being accurately described by idealized Equation 4. However, in most systems, geometries will not allow this idealized function and much of the capacitance comes from fringing flux lines, i.e., the effect of the non-idealized plates "fringing." The fringing makes the geometry of the conductive plates much more flexible by sacrificing possible accuracy. At the extreme case, the conductive plates may not be across from each other at all and the total capacitance will be from the fringing. In this case, the capacitance will still be inversely proportional to the distance between the conductive plates and proportional to the area of the conductive surfaces. However, the capacitances measured will be considerably lower and therefore, more prone to error.

Figure 4:
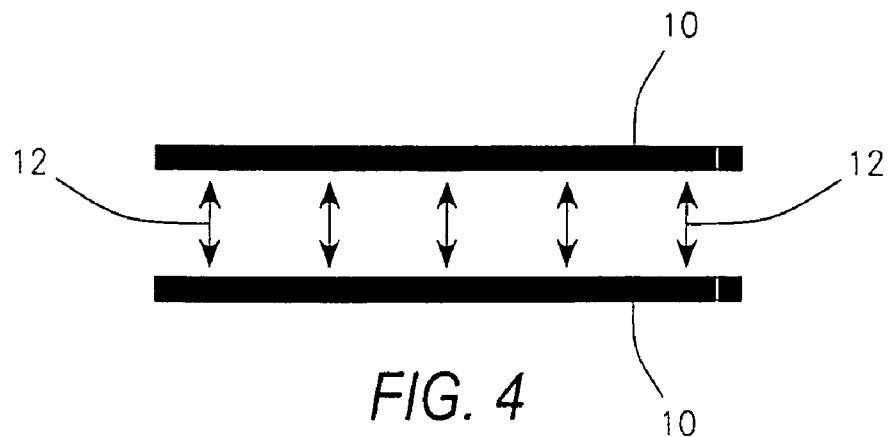
FIG. 4 illustrates the idealized flux between conductive sensor plates of a main capacitive sensor in accordance with an illustrative embodiment of the method and apparatus for sensing levels of insoluble fluids disclosed herein.
Figure 5:
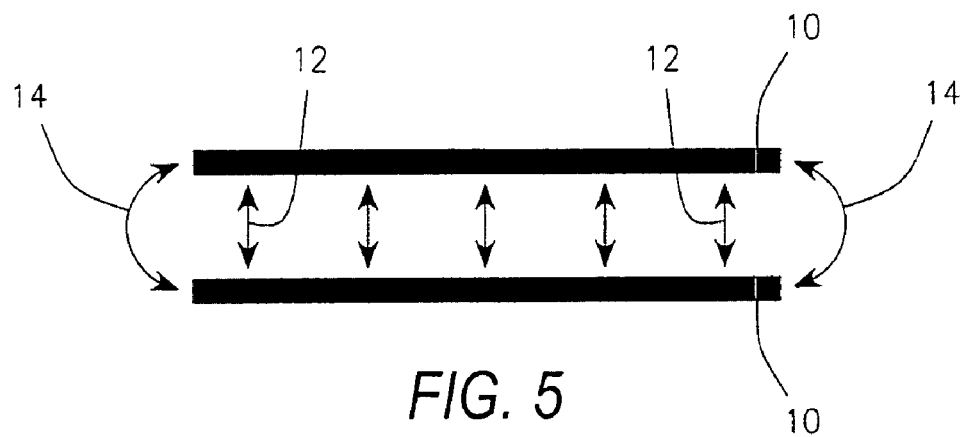
FIG. 5 illustrates the fringing flux between conductive sensor plates of a main capacitive sensor in accordance with an illustrative embodiment of the method and apparatus for sensing levels of insoluble fluids disclosed herein.
Figure 6:
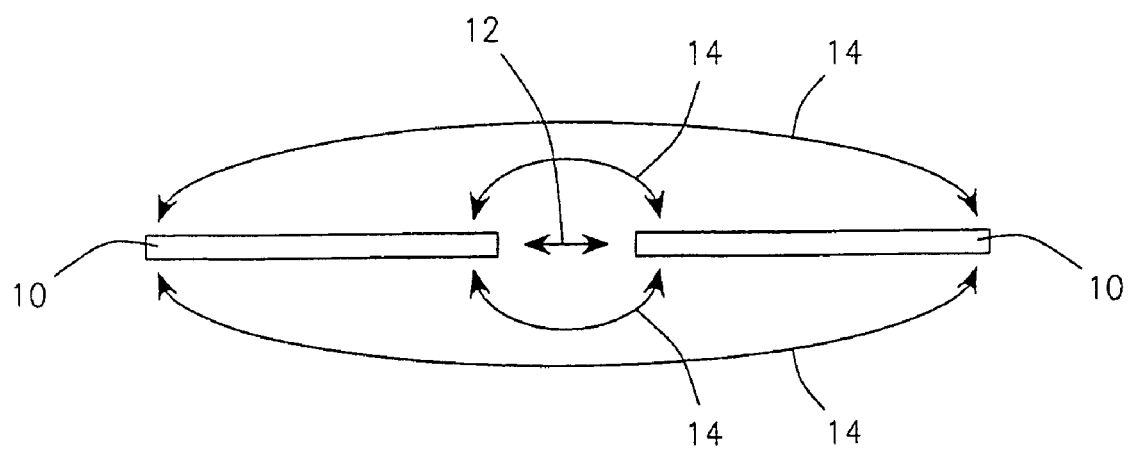
FIG. 6 illustrates the scenario where the majority of the capacitive coupling between the conductive sensor plates of a main capacitive sensor is almost completely a result of fringing effects in accordance with an illustrative embodiment of the method and apparatus for sensing levels of insoluble fluids disclosed herein.

FIG. 4 illustrates the idealized flux 12, while FIG. 5 illustrates the fringing flux 14. As can be seen, as the conductive plates 10 get wider or the distance between them gets smaller, the fringing effect 14 is decreased. FIG. 6 illustrates the scenario where the majority of the capacitive coupling between the conductive plates 10 is almost completely a result of fringing effects 14, which results in a deviation from generalized Equation 2 above, however, the relationship remains proportional to the equations. When the specific geometries of the conductive plates 10 are two opposing trapezoids, as fully discussed below, the fringing effect 14 does have an effect, and it is seen as a larger linear term in Equations 5 and 6 supra, which are the numerical simplification of Equation 3b. Equation 3b, infra, is an idealized solution for Equation 2 given two fluids and main capacitive sensors utilizing inverted trapezoid conductive plates. Therefore, the fringing flux causes H, K, N and P to be proportionally larger than J, L, O and Q in Equations 5 and 6 than would be expected by the idealized Equation 4. This demonstrates that multiple geometries with differing angles and ratios of distance to conductive plate 10 area can be used, which still satisfy the general equations above. Therefore, Equation 2 can be adapted to any conductive plate 10 geometry by allowing them to describe proportionality rather than equality.

Figures 10A, 10B, 10C:
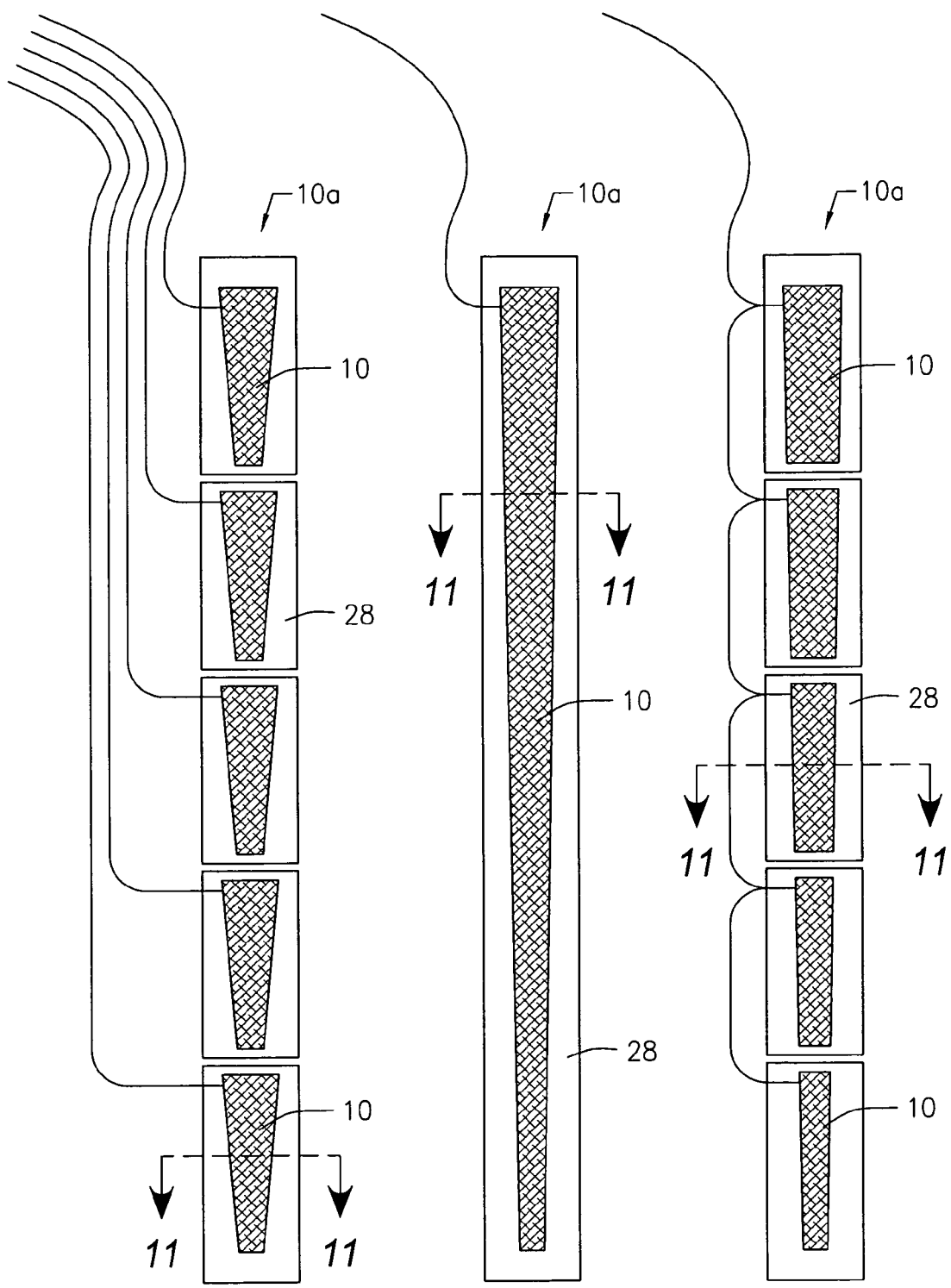
FIGS. 10A, 10B and 10C are cross-section views along line 10-10 of examples of the conductive sensor plates in accordance with illustrative embodiments of the method and apparatus for sensing levels of insoluble fluids disclosed herein.
Figure 11:
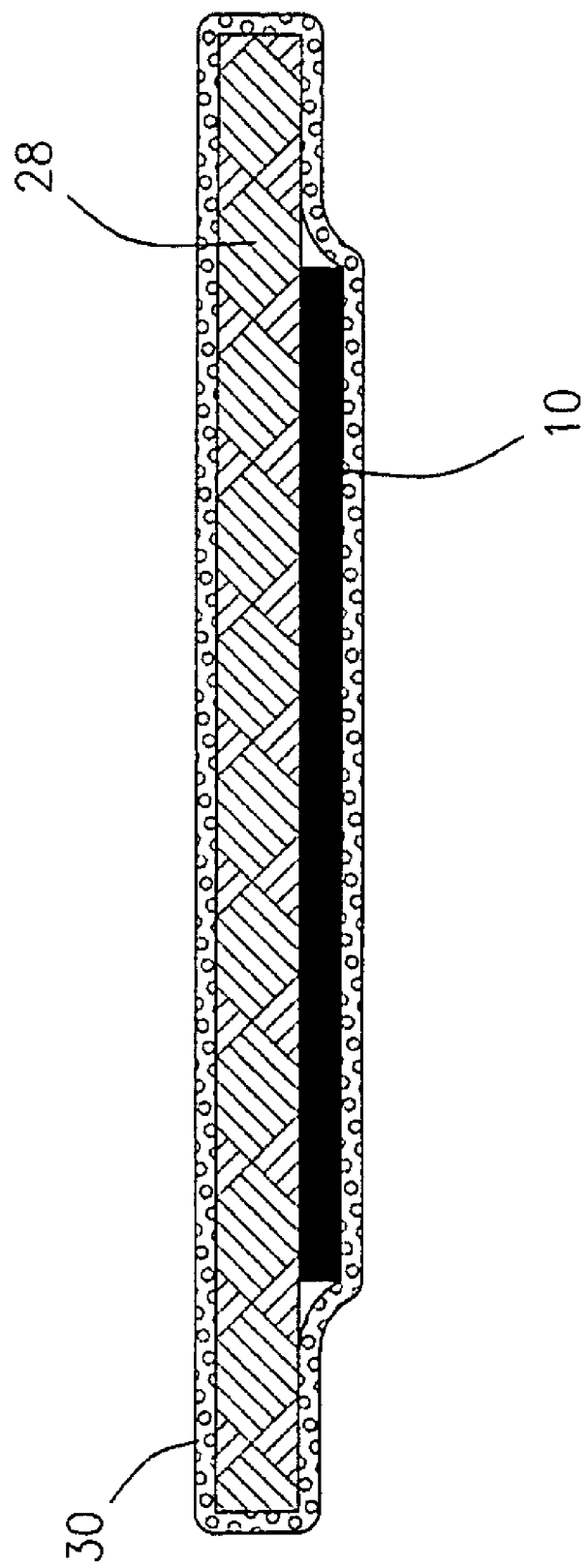
FIG. 11 is a cross-section view along line 11-11 of a conductive sensor plate shown in FIGS. 10A, 10B and 10C.

Turning now to FIGS. 7 through 11, which illustrate examples of the conductive plates 10 of the main capacitive sensors 26 of the method and apparatus for sensing levels of insoluble fluids disclosed herein, FIG. 7 illustrates a main capacitive sensor array 18 submerged in a vessel 20 containing the insoluble fluids (22a, 22b and 22c) to be measured. As shown in FIGS. 7 and 8A, the main capacitive sensor array 18 may be cylindrical having a plurality of inlet ports 24, and as shown in the FIG. 8B, the main capacitive sensor array 18 may take a triangular form. It will be appreciated that the main capacitive sensor array 18 could have other forms and arrangements in keeping with the spirit and scope of the disclosure. The main capacitive sensor array 18 includes a plurality of capacitive sensors 26a and 26b, with each main capacitive sensor 26 being comprised of a pair of opposing, mirror-imaged, conductive sensor plates 10a and 10b and 10c and 10d, respectively. Each of the conductive sensor plates 10 in a main capacitive sensor may be separated by a spacer and may also be in vertical alignment running substantially parallel to one another. Referring to FIG. 11, each of the conductive plates 10 may be supported on a rigid, non-conductive substrate 28, such as fiberglass. An insulator 30, such as Teflon®, may cover the face of the substrate 28 or may fully encapsulate both the conductive plate 10 and the substrate 28 as shown. Each of the conductive plates 10 may be comprised simply of any conductive metal or material, if the conductive metal forming the conductive plate 10 has a sufficient rigidity.

As is fully discussed below, each of the main capacitive sensor arrays 18 may include a reference sensor (such as 32) placed intermittently along the height of the vessel 20 to provide input to the system as to the permittivities of the insoluble fluids, and therefore the appropriate coefficients to be used in the equations. Similarly to the main capacitive sensors 26a and 26b, the reference sensor 32 includes at least one pair of mirrored reference plates 34a and 34b. Alternatively, the reference plates 34a and 34b may be included on a substrate 28 of the capacitive sensor 26 so long as the reference plates 34a and 34b are electrically isolated there from.

Turning now to FIG. 9, which illustrates an example of a conductive plate 10a for a main capacitive sensor 26a, a conductive plate 10c for main capacitive sensor 26b, and a reference plate 34a of the reference sensor 32 in accordance with an illustrative embodiment of the method and apparatus for sensing levels of insoluble fluids disclosed herein. The geometries of the conductive plates 10a and 10c differ in each of the main capacitive sensors 26a and 26b, while the geometries of paired conductive plates 10a and 10b of main capacitive sensor 26a, conductive plates 10c and 10d of main capacitive sensor 26b, and reference plates 34a and 34b of reference sensor 32 are mirror images, respectively.

As further shown in FIG. 9 for purposes of exemplification, the method and apparatus are described to measure at least two (2) unknown insoluble fluids with reference to using conductive plates 10a, 10b, 10c and 10d of main capacitive sensor 26a and 26b, respectively, with opposing trapezoid geometries, with one pair having the apex of the trapezoid at the bottom of the conductive plates 10a (and 10b not shown) of the main capacitive sensor 26a, while the other trapezoid has its apex at the top of the conductive plate 10c (and 10d not shown) of the main capacitive sensor 26b. It will be appreciated that the method and apparatus can be utilized with the conductive plates 10 being any geometry; however, the specific geometries illustrated and discussed herein are merely for purposes of exemplification and should not be so limited. A trapezoidal geometry was chosen for linearity of measurement along the entire height of the vessel 20, to decrease some fringe effects 14 that may result from a similar solution using triangles, and to offer a high level of differentiation between the w(x,y,z) for the two conductive plates 10 while giving less compromise to the overall physical size of the main capacitive sensor 26. Given the trapezoidal geometry for illustration purposes, the following equations describe the capacitances:

Apex on Top (A)

$$C_A = G + H^* z_w - J^* z_w^2 + K^* z_o - L^* z_o^2 \quad \text{(Equation 5)}$$

Apex on Bottom (B)

$$C_B = M + N^* z_w + O^* z_w^2 + P^* z_o + Q^* z_o^2 \quad \text{(Equation 6)}$$

where G and M are the offsets given from empty measurement, and H, J, N, and O are the coefficients that describe water, and are themselves variables, which are adjusted from measurements taken from the reference sensor plates 34a and 34b of reference sensor 32 that may be intermittently spaced along the length of the capacitive sensor array 18. K, L, P, and Q are the equivalent coefficients for oil. The variables used for determining the coefficients are the slope of the trapezoids, the base width, the apex width, the distance between the conductive plates 10 of the main capacitive sensors 26, any change in the distance between the conductive plates 10 of the main capacitive sensors 26, the dielectric of the insoluble fluids, and any change detected in the dielectric of the insoluble fluids.

The paired conductive plates 10 of each of the main capacitive sensors 26 can be contiguous and flat (as illustrated in FIG. 10B), separated from each other on separate modules (as illustrated in FIG. 10C), separated from each other but share a common ground plate (as illustrated in FIG. 10A), or be wrapped around a cylindrical tube (as illustrated in FIG. 8A). The modular conductive plates 10 illustrated in FIG. 10A may also include separated ground plates. In any event, if the conductive plates 10 are separated by have a continuous geometry, then the conductive plates 10 may be electrically daisy chained; however, if the conductive plates 10 use a repetitive geometry, the electrical connections must be isolated to each conductive plate module. Any of these configurations and/or geometries can be used as long as general Equation 2 and the constraints are satisfied.

The main capacitive sensors 26 of the method and apparatus disclosed herein may also be modular thereby providing the ability to manufacture and ship the conductive plates 10 of each main capacitive sensor 26 in smaller components than the final install. For example, five, five foot (5') tall sections or modules of a conductive plate 10 may be provided for a twenty-five foot (25') vessel. For example, modularity may be accomplished by splitting the conductive plates 10 into modules that continue the geometry of the original functions, as shown in FIG. 10C. Using this method, modules of the conductive plates 10 of the main capacitive sensor 26 would appear electrically to be the main capacitive sensor 26. Modularity may also be accomplished by utilizing conductive plates 10 having repeating geometries (as shown in FIG. 10A) or differing geometries that satisfy the general equations. This method requires that a separate connection be made to each module of each conductive plate 10 back to the measuring electronics. Electrically, each conductive plate pair 10 would simply be an independent capacitive sensor 26, which can be used to deduce fluid levels with respect to the other conductive plate pairs 10 in the modular design.

Measuring Capacitance Using the Capacitive Sensors:

The capacitance measurement is taken using an RC time constant decay of an RC filter created by one conductive plate 10 of the main capacitive sensor 26 (e.g., conductive plates 10b and 10d of capacitive sensors 26a and 26b, respectively), a ground (e.g., conductive plates 10a and 10c connected to ground), and a parallel connected precision resistor. Each main capacitive sensor 26, exclusive of any reference sensors 32, is charged to a precise voltage and the connection to the charge source is disconnected when time t=0. The charge on the main capacitive sensor 26 will dissipate through the precision resistor at a known rate, which causes the voltage across the capacitive sensor 26 to decrease at the same rate. When the voltage on the conductive plates 10 crosses a known threshold, a time measurement is taken t=x. From the difference in time of t=0 to t=x, the capacitance of the main capacitive sensor 26 can be accurately derived. An averaging and oversampling scheme may also be put in place to provide better accuracy as well as to cancel out fluctuations in vessel level associated with waves or other agitation. The time measurement approach is beneficial due to the necessity of having a very large dynamic range in sensing without loss of precision. Any method for actually measuring the capacitance could be used, such as phase shift and attenuation of an AC signal, charge time rather than discharge time, resonant calculations, etc.

Calculating Insoluble Fluid Heights:

Once an accurate capacitance measurement is taken using the main capacitive sensor 26, numerical solutions to Equations 5 and 6 derived from the main capacitive sensor geometry are calculated by substituting $z_w$ and $z_o$ and comparing $C_A$ and $C_B$ to the measured capacitance from the main capacitive sensors. If it is of interest, $z_w$ is calculated based on a bisection method by starting at $z_w = h/2$ and finding all values of C by incrementing $z_o$. If these calculations are lower than the measurement, $z_w$ is increased to h*0.75; if these calculations are lower, $z_w$ is decreased to h*0.25 and in this manner dissect down to the sub-millimeter range in granularity. With present processor technologies, a direct solution is not as practical and is more prone to gross errors resulting from minor errors in reading between the conductive plates 10 of the main capacitive sensor 26. Therefore, solutions at an acceptable granularity are produced and compared to the actual readings. The solution pair for the unknown heights, which offers the smallest sum of deviations from the actual capacitance measurements taken, is selected as the appropriate solution.

Reference Sensor:

Given the fact that the dielectrics of oil and water vary greatly with temperature, impurities, and even pressure, it may prove important in calculating the expected capacitance values to normalize the equations to a standard permittivity of the fluids. In order to provide this ability, smaller, paired reference conductive plates 34a and 34b of reference sensors 32 may be placed intermittently along the height of the vessel 20 to provide input to the system as to the permittivities of the fluids, and therefore, the appropriate coefficients to be used in the equations. A temperature sensor (as illustrated in the electrical schematic of FIG. 18) may also be utilized to provide feedback for this purpose along with providing valuable temperature information back to the user. The combination of the reference sensor 32 and the temperature sensor can provide information about the quality and composition of the fluid in the vessel. The reference sensor 32 can also provide a sanity check on the fluid levels sensed by the main capacitive sensor 26, or act as a cutoff switch for full and empty vessels.

The algorithm for using the reference sensor is as follows. If the capacitance value of a reference sensor is changing, check and compare with the other reference sensor values. If the capacitance value at one of the reference sensors is not changing in comparison to the capacitance value at one of the other reference sensors, then the reference sensor in question must be on a fluid interface. Likewise, if one of the reference sensors derives a dielectric value that shows to be outside an acceptable range of dielectric values for any of the given measured fluids, the reference sensor in question must be on an interface line or is erroneous. Therefore, the value of the dielectric at this reference sensor should not be used to replace the coefficients in the equations, but they do give valuable information as to the specific height of the fluids if needed. If these reference sensors are at the top or bottom of the vessel, they provide "empty" and/or "full" information. If the main capacitive sensors show movement of fluid, any reference sensor that does not show change in capacitance can be assumed to be fully submerged in a fluid (e.g. air, oil, or water) exclusively. Therefore, the values for the dielectrics at these reference sensors can be used to fine-tune the coefficients in the equations. Values read at the reference sensor will be thrown out for use as coefficient correction data in any of the following scenarios: if they fall outside an acceptable range of dielectrics for any of the fluids in question; if erroneous data is gathered so that one reference sensor appears to be in a fluid that is more dense yet above a less dense fluid; or if multiple reference sensors are changing when neither the temperature nor the main capacitive sensors are changing.

The method for measuring the reference sensor may utilize series AC attenuation/phase shift method. This method lends itself to the purposes here because it allows both conductive plates to float electrically (no extra ground plates to provide non-linearities in the main capacitive sensors) and since the interface area is fixed and small, a smaller dynamic range has been implemented.

Figure 12:
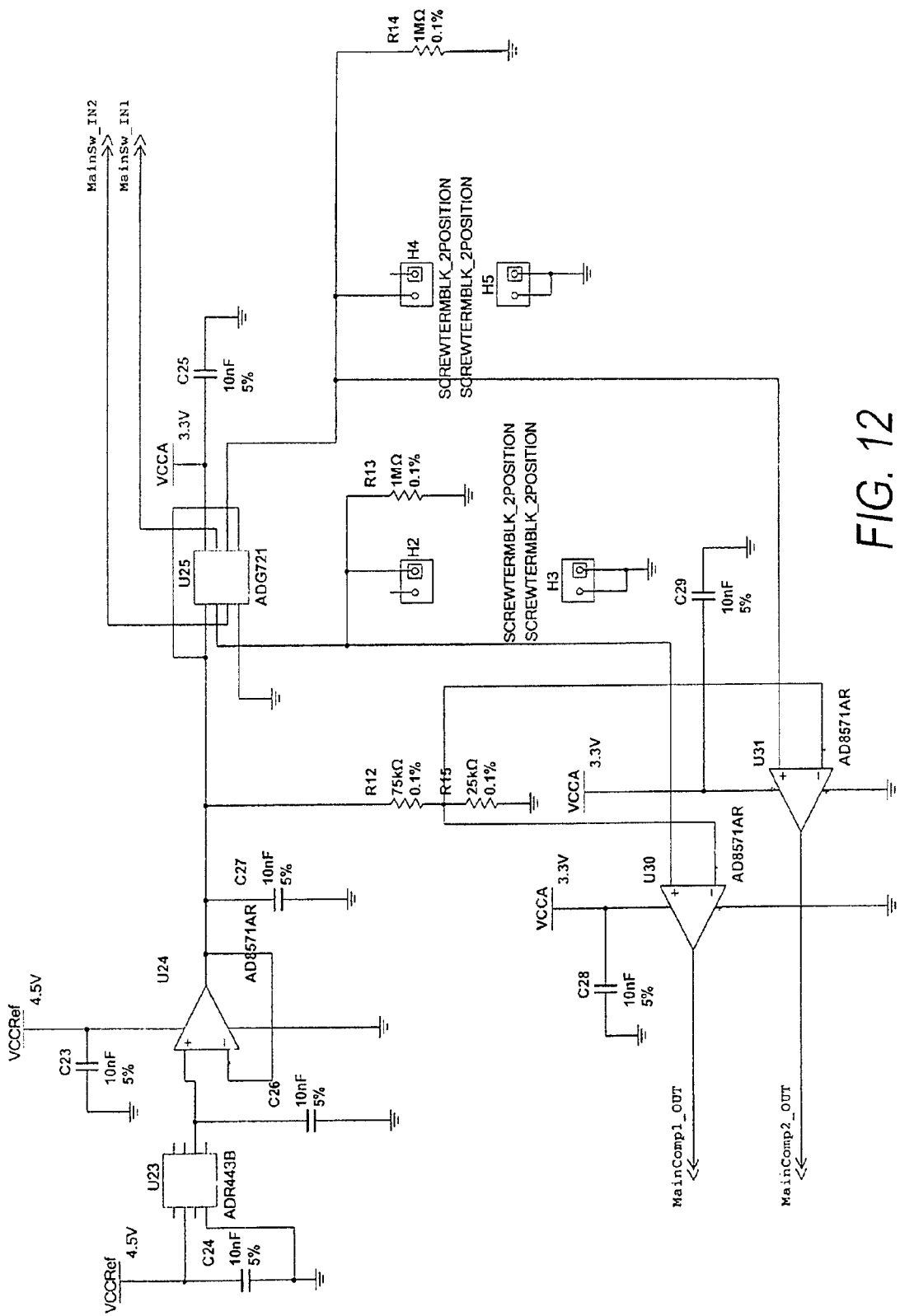
FIG. 12 is an electrical schematic of an example of an interface to conductive sensor plates of a main capacitive sensor in accordance with an illustrative embodiment of the method and apparatus for sensing levels of insoluble fluids disclosed herein.

Referring now to FIG. 12 illustrating an electrical schematic of the circuitry of the conductive plates disclosed herein, the circuit interfaces between the processor (shown in FIG. 14) and the variable geometry conductive plates to take a capacitance reading. U23 (reference voltage generator), U24 (op-amp in voltage follower configuration), C23, C24, C26, and C27 make up a simple buffered, high precision reference supply at 3.0 V. This supply is routed to one side of a DPST, solid-state switch, U25. The processor controls the switch position using the MainSw_INx lines. The main conductive plate pairs are connected to H2/H3 and H4/H5 respectively. One of the conductive plates in each pair of the capacitive sensor is connected to ground through H3 or H5, while the other conductive plate in each pair making up the capacitive sensor is connected to H2 or H4. This forms two distinct capacitors with respect to ground. When the switch, U25, is in the open position, H2 and H4 are left open and therefore any charge present in the capacitor discharges to ground through the high resistance R13 and R14. When the processor closes the switches, H2 and H4 are connected to the buffered reference voltage and charge up very quickly to 3.0 V.

In order to take the capacitance measurement, the processor closes one or both switches to allow the capacitive plates to charge to 3.0V. When ample charge time has taken place, the switch is opened allowing the charge to dissipate through the 1M resistors with no connection to the buffered reference to recharge it. The voltage on the capacitor pair is directly proportional to the total charge held in the plates and therefore decays in the same manner. The relationship between voltage, capacitance and time used in this scenario can be described by the following equation:

$$V(t)=V_F+(V_i-V_F)e^{-t/RC} \quad \text{(Equation 7)}$$

where $V_F$=Final Voltage=0, $V_i$=Initial Voltage=3.0V, and R=1M Ohm.

When the switches are opened, the processor simultaneously begins a timer. The voltage on the conductive plate is monitored by the op-amps configured as comparators, U30 and U31. Once this voltage goes below the threshold generated from the reference voltage by R12 and R15, the output of the comparator toggles and the connections to the processor. MainCompX_OUT, cause the processor to stop the timer. This gives an accurate measurement of the time necessary to discharge the plates to a known voltage from 3.0V. Now that t is known, C can be calculated. Should the measurements taken have excessive noise on the line, the measurements can be repeated many times and averaged. When the comparator has toggled, the processor can close the switch again to initiate the next measurement sequence.

Figure 13:
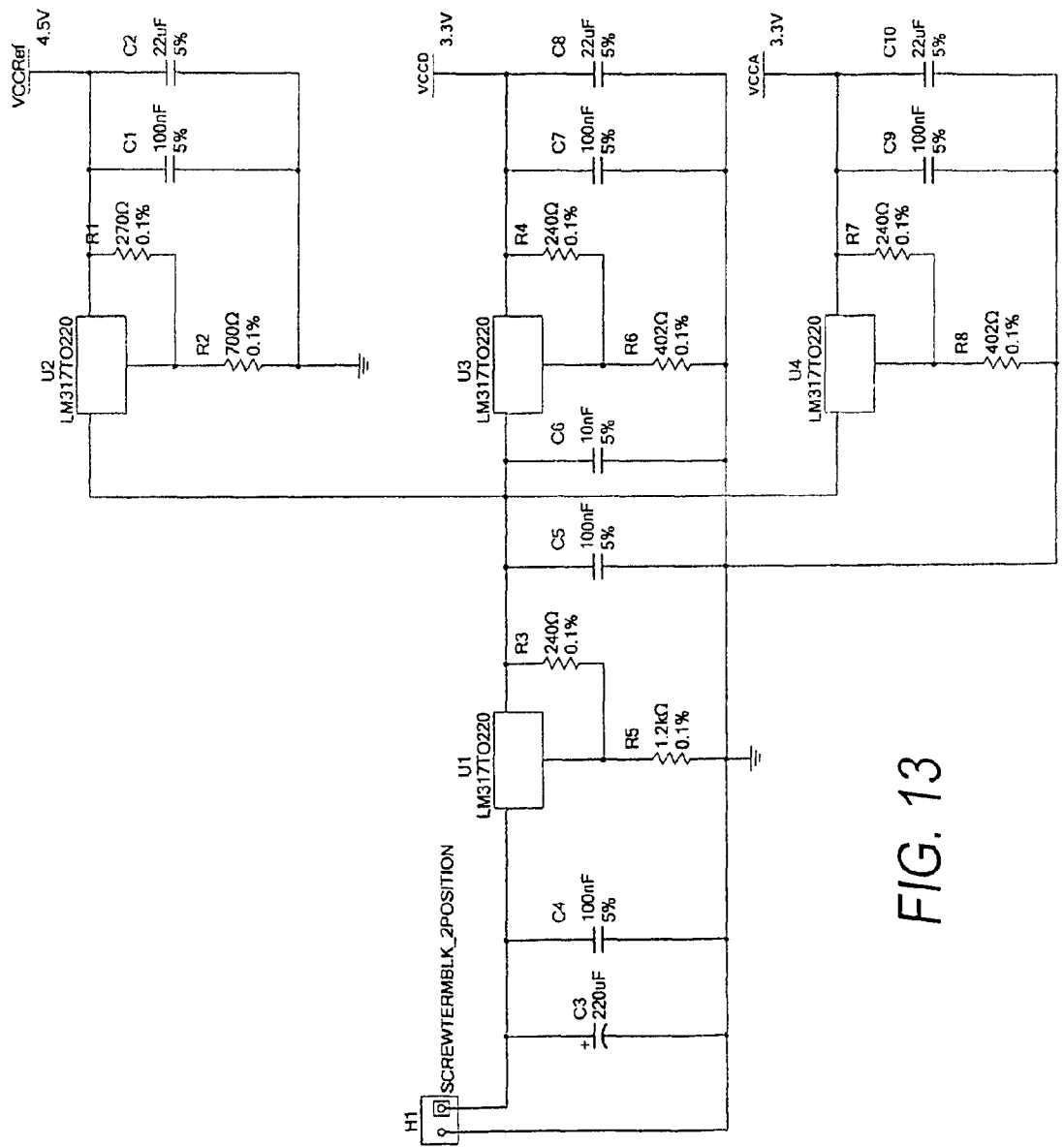
FIG. 13 is an electrical schematic of an example of a power supply in accordance with an illustrative embodiment of the method and apparatus for sensing levels of insoluble fluids disclosed herein.

Turning now to FIG. 13, which illustrates an electrical schematic of a power supply of the method and apparatus disclosed herein, where the power supply is a linear power supply having a 9-20 V DC supply connected to H1. The combination of C3, C4, U1, R3, and R5 down converts the input to 7.5 V and provides initial filtering of the input power to remove fluctuations in supply voltage. U2, R1, R2, C1, and C2 provide the 4.5 V rail, which is used to generate the 3.0V reference voltage used by the conductive plate measurement circuit, shown in FIG. 12. The circuit surrounding U3 and U4 generate identical 3.3 V rails. VCCD supplies all digital parts such as the processor and serial transceivers, and VCCA supplies all the analog parts, such as the op-amps and comparators. This separation is necessary to prevent noise from the digital switching of the digital parts from backfeeding onto the supply and generating noise in the analog circuitry.

Figure 14:
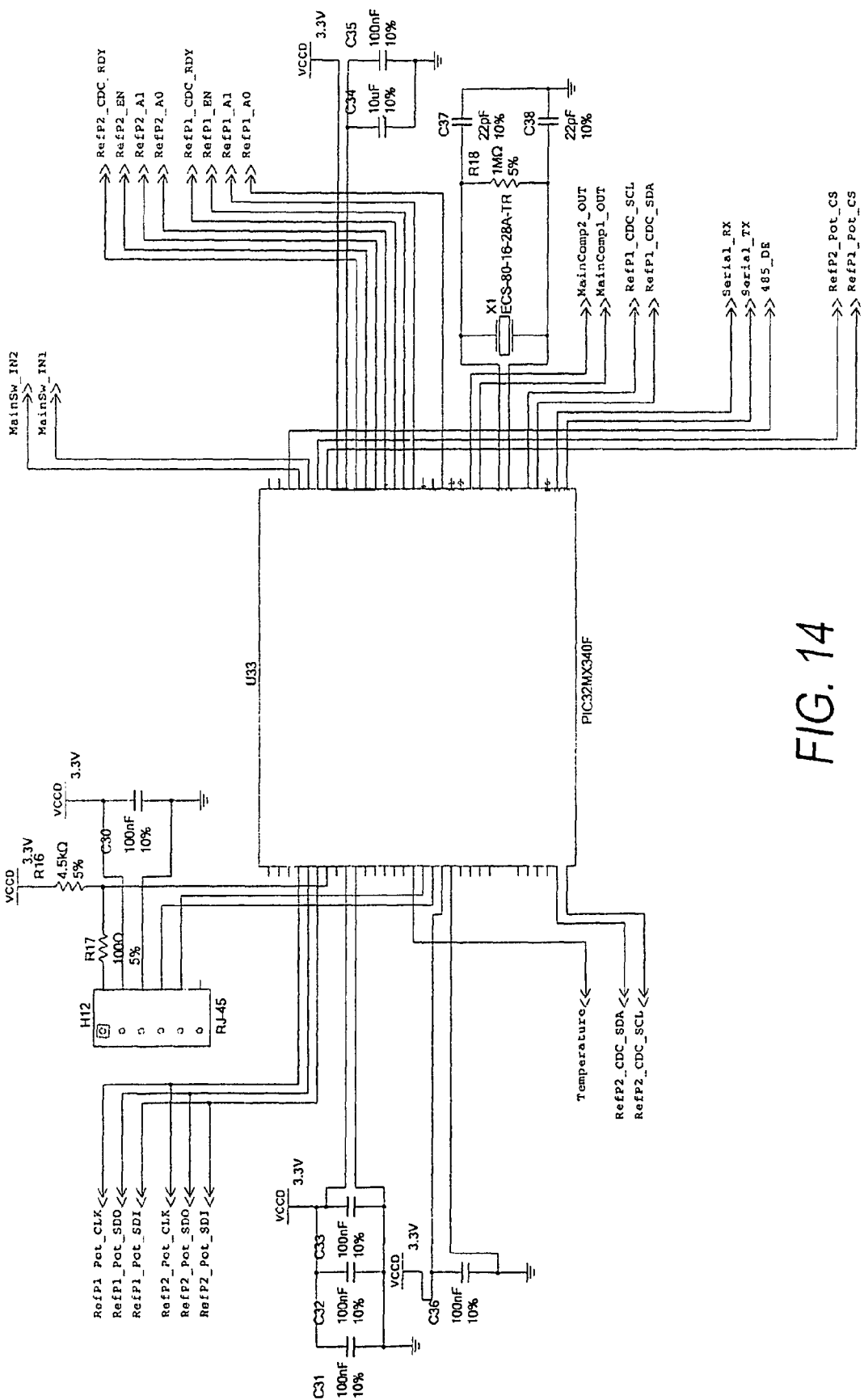
FIG. 14 is an electrical schematic of an example of a processor in accordance with an illustrative embodiment of the method and apparatus for sensing levels of insoluble fluids disclosed herein.

FIG. 14 is an electrical schematic of the processor and shows the necessary connections of the processor to the power supply (FIG. 13), as well as the proper pin connections to the rest of the circuit. The processor may be of a type with a fast running timer, thereby allowing higher resolution measurements of the capacitances, as previously described with reference to the conductive plate circuitry in FIG. 12. H12 allows for in circuit programming and debugging of the software.

Figure 15:
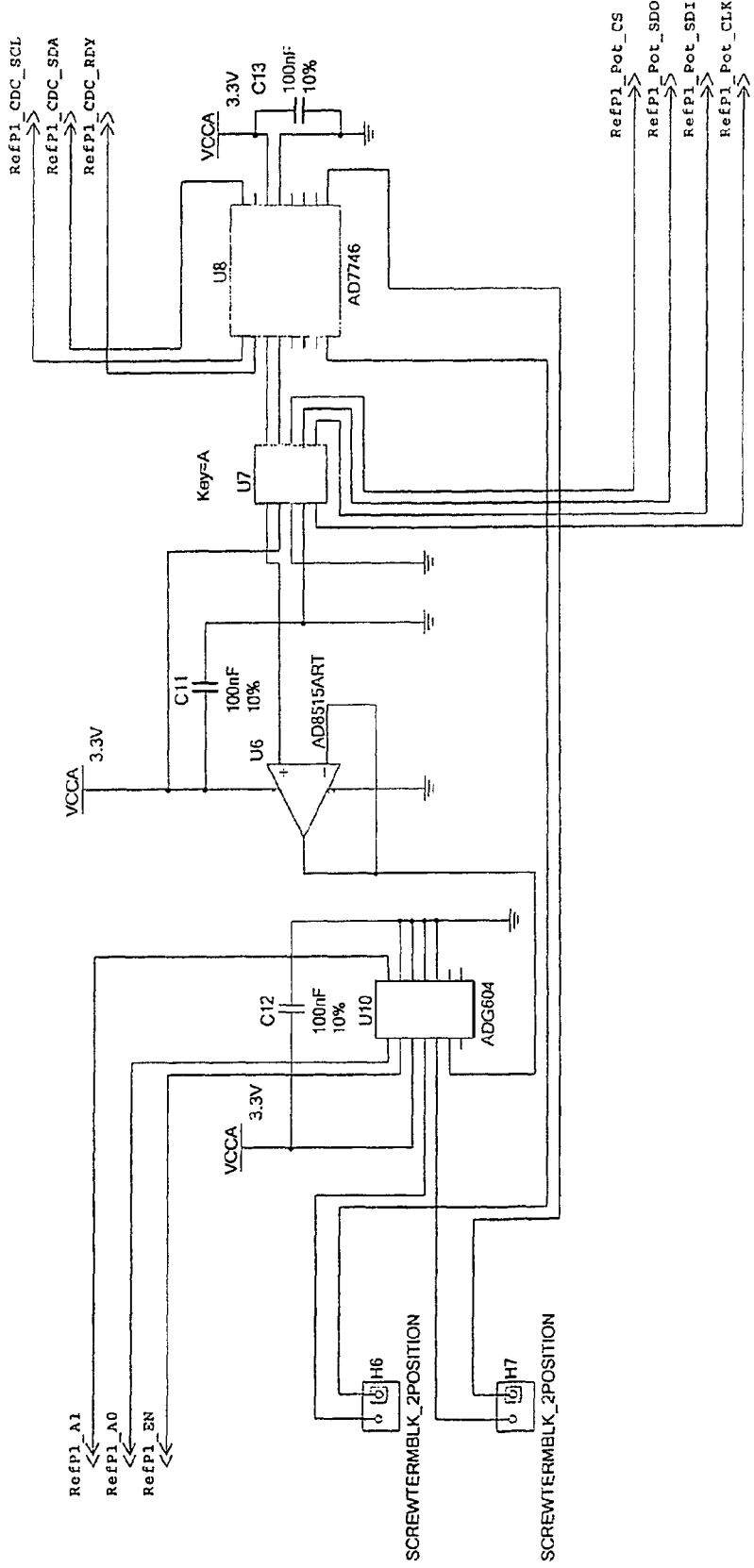
FIG. 15 is an electrical schematic of an example of an interface to reference plates of a reference sensor in accordance with an illustrative embodiment of the method and apparatus for sensing levels of insoluble fluids disclosed herein.
Figure 16:
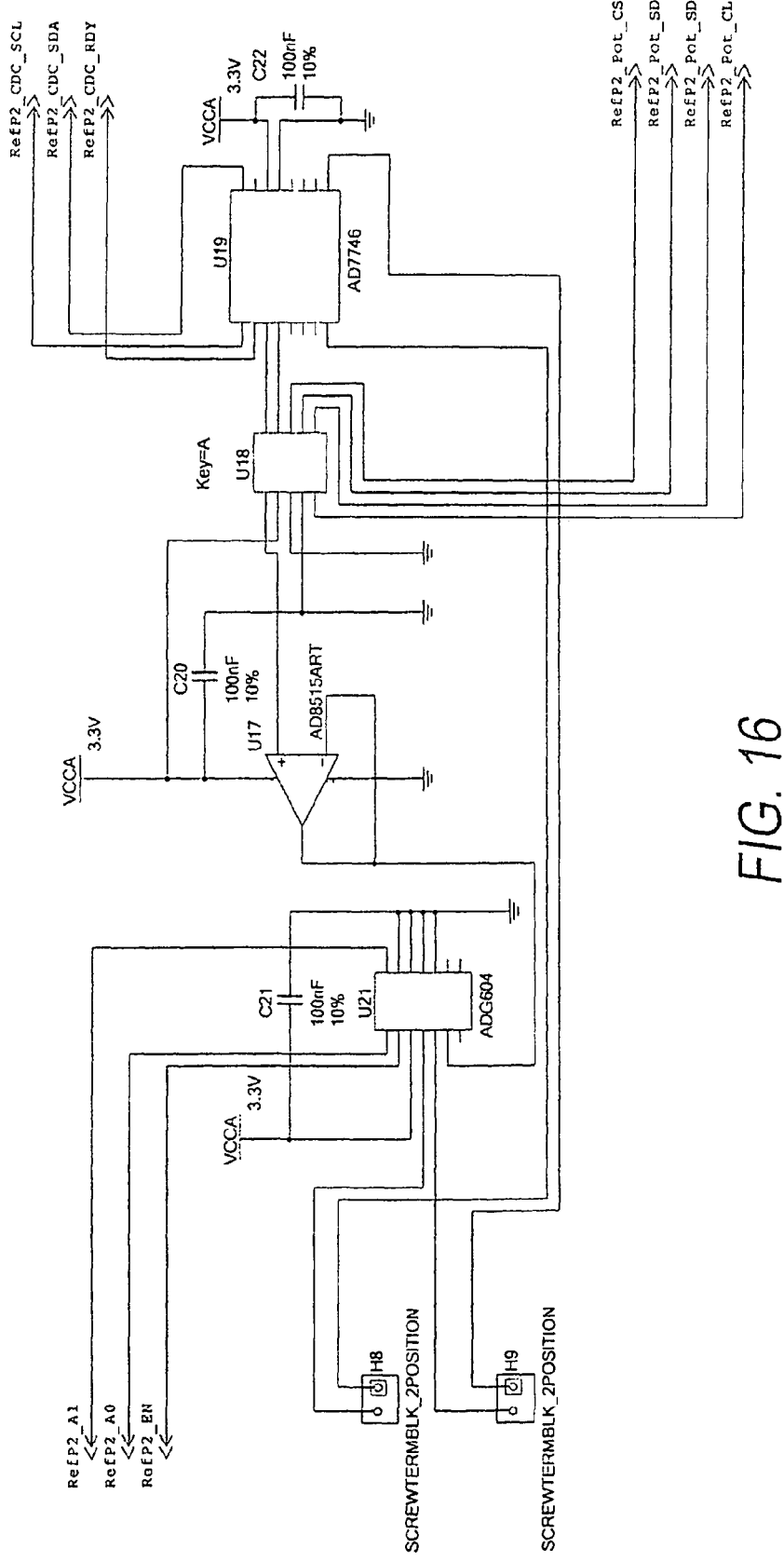
FIG. 16 is an electrical schematic of an example of reference plates of a reference sensor in accordance with an illustrative embodiment of the method and apparatus for sensing levels of insoluble fluids disclosed herein.

FIGS. 15 and 16 illustrate electrical schematics for an interface of the reference plates of a reference sensor, and in order to accurately read the capacitance on the reference plates and to keep the presence of the reference plates from influencing the reading taken on the conductive sensor plates, a different method of measurement may be employed. U8 is a capacitance to digital converter, which allows high precision readings of small capacitances by producing an AC waveform that is sent to one side of a reference plate pair. The signal is coupled to the other reference plate and is attenuated by the reference sensor in question. The smaller the capacitor, the smaller the signal as it passes through the second reference plate. This effect is further amplified by the fact that the capacitance causes a phase shift to occur in the returning signal. The returning signal is compared to an ideal signal analogous to a known capacitance value, and the difference between these signals translates to the actual capacitance measurement.

U7 is a digital potentiometer, which attenuates the excitation voltage without a phase shift. This gives the circuit the ability to sense a larger capacitance than U8 can naturally sense, and thereby increases the dynamic range of the measurement by sacrificing resolution. To ensure source impedance is not an issue, an op-amp is placed to buffer the circuit. This signal is routed to a switch so that the excitation voltage can be sent to multiple reference plate pairs. The signals RefPX_AX give the processor control over which reference plate is being measured, while RefPX_EN turns the switch on and off. RefPX_CDC_XXX provides the interface between the processor and the capacitance to digital convertor, which takes place over a standard I2C bus. RefPX_Pot_XXX lines provide the interface for the processor to control the attenuation of the excitation voltage through the digital potentiometer by utilizing an SPI interface.

Figure 17:
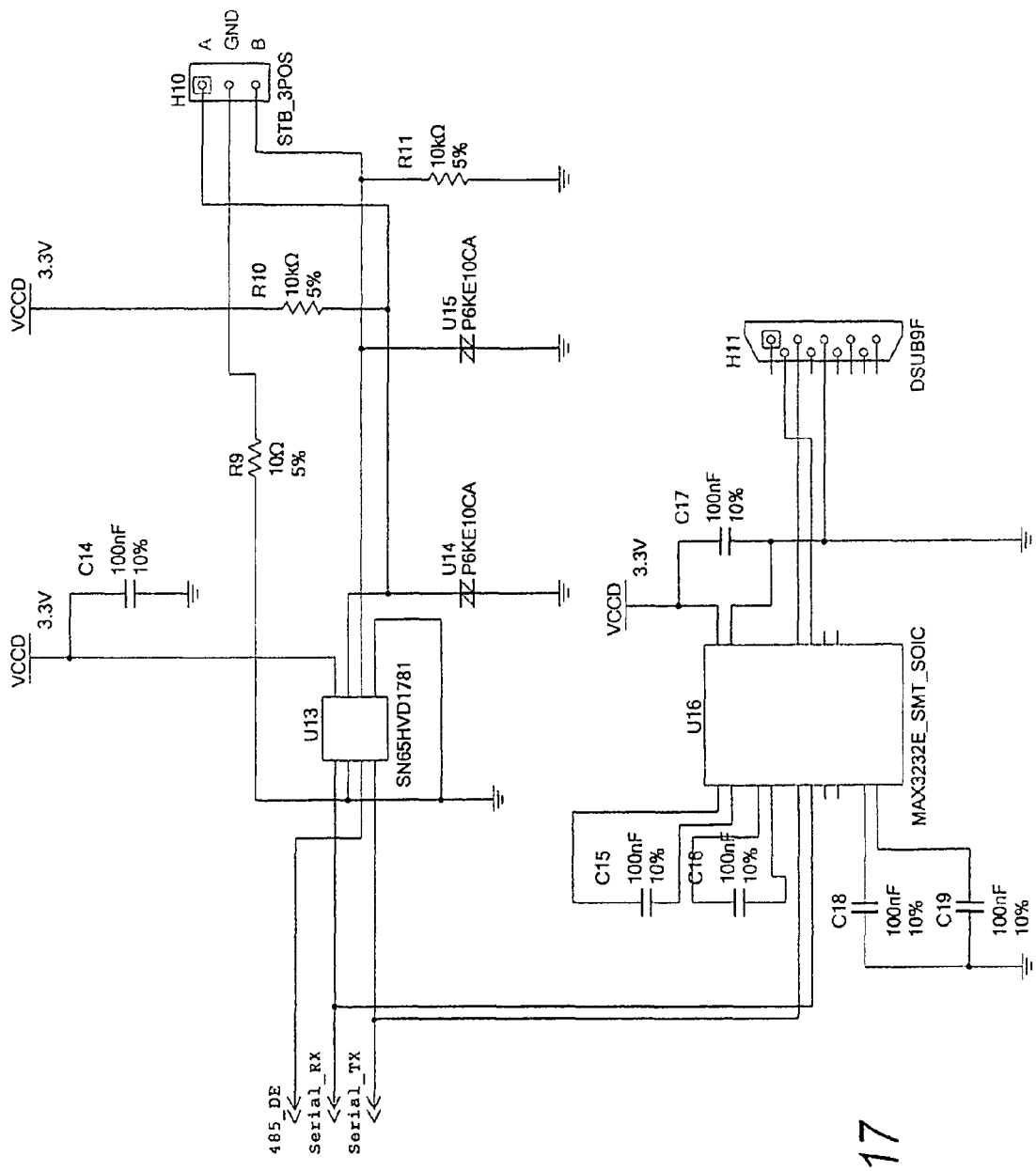
FIG. 17 is an electrical schematic of an example of a serial interface in accordance with an illustrative embodiment of the method and apparatus for sensing levels of insoluble fluids disclosed herein.

Turning now to FIG. 17, a serial interface circuit provides the ability for the processor to provide the calculated data to the outside world. There are two interfaces available: RS-485 is a standard industrial serial interface and is provided through U13 and the accompanying circuitry and interfaced through H10; and RS-232 is a standard PC serial interface that uses a DB-9 connector, which is provided through U16 and the associated circuitry.

Figure 18:
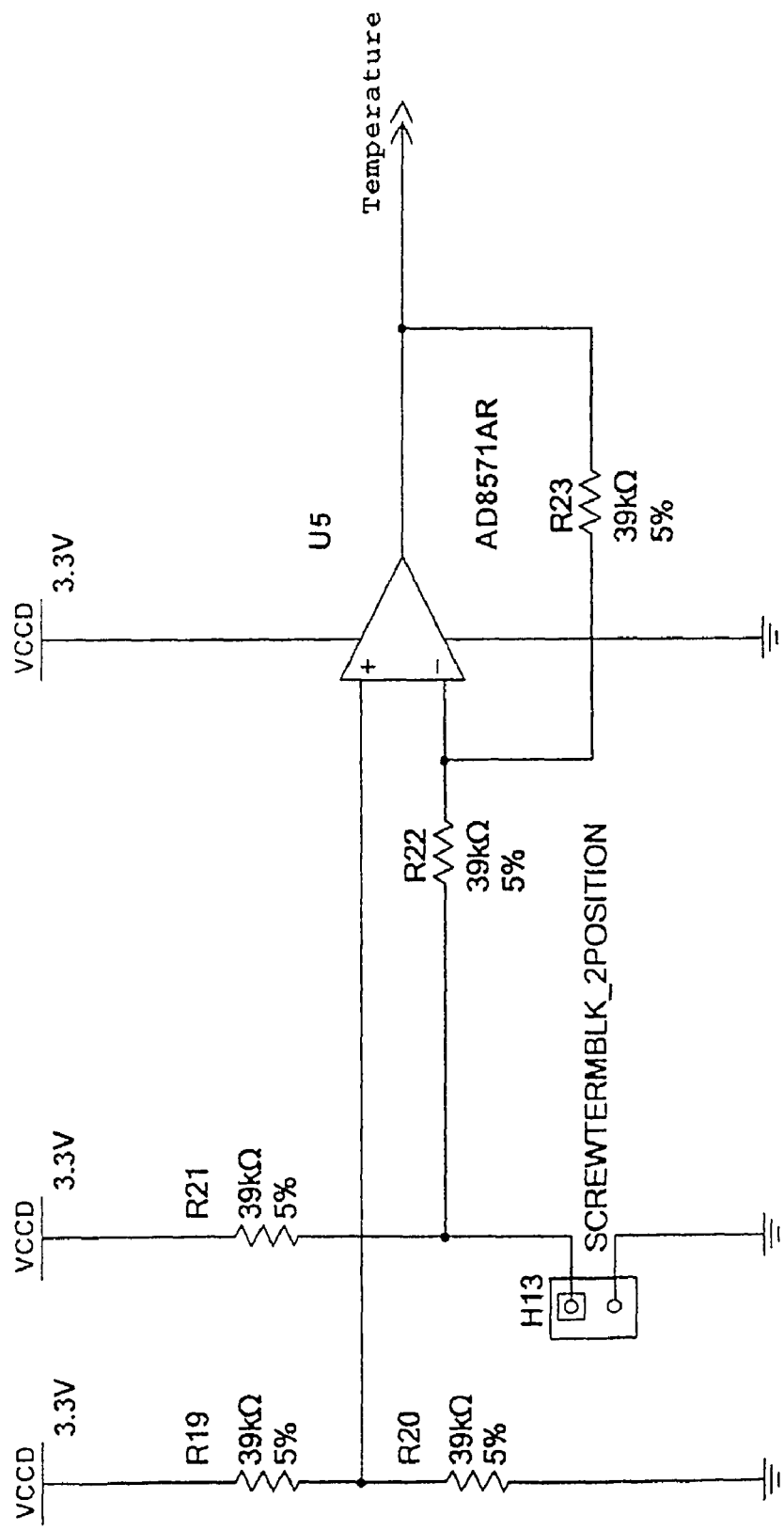
FIG. 18 is an electrical schematic of an example of a temperature circuit in accordance with an illustrative embodiment of the method and apparatus for sensing levels of insoluble fluids disclosed herein.

FIG. 18 illustrates an electrical schematic for a temperature sensor to provide temperature information to the user along with providing additional information as to the permittivities of the fluids, and thereby allowing the appropriate coefficients to be used in the equations.

It will be understood that the apparatus and methods disclosed herein may be used for sensing levels of the following non-exhaustive types of insoluble fluids: crude oil and water; milk and cream; fresh water and brine, and any other insoluble fluids. It will be further understood that many different capacitor configurations could be used with the method and apparatus for sensing levels of insoluble fluids as disclosed herein. Capacitors may be shaped to correspond to different vessel capacity gradients over the range of fluid levels. The method and apparatus disclosed herein may be readily constructed using integrated circuit technology or other similar technologies.

Whereas, the devices and methods have been described in relation to the drawings and claims, it should be understood that other and further modifications, apart from those shown or suggested herein, may be made within the spirit and scope of this invention.

What is claimed is:

1. An apparatus for measuring discrete heights of at least two insoluble fluids, said apparatus comprising:
at least two main capacitive sensors having distinct geometries; and wherein said geometries of said sensors satisfy the following equation:

$$C_A = \varepsilon_0 \varepsilon_a \frac{\int_0^{z_a} w_A(x,y,z)\,dz}{\left[\frac{\int_0^{z_a} d_A(x,y,z)\,dz}{z_a}\right]} +$$

$$\varepsilon_0 \varepsilon_b \frac{\int_{z_a}^{z_b} w_A(x,y,z)\,dz}{\left[\frac{\int_{z_a}^{z_b} d_A(x,y,z)\,dz}{z_b - z_a}\right]} \ldots \varepsilon_0 \varepsilon_n \frac{\int_{z_{n-1}}^{z_n} w_A(x,y,z)\,dz}{\left[\frac{\int_{z_{n-1}}^{z_n} d_A(x,y,z)\,dz}{z_n - z_{n-1}}\right]}$$

$$C_B = \varepsilon_0 \varepsilon_a \frac{\int_0^{z_a} w_B(x,y,z)\,dz}{\left[\frac{\int_0^{z_a} d_B(x,y,z)\,dz}{z_a}\right]} +$$

$$\varepsilon_0 \varepsilon_b \frac{\int_{z_a}^{z_b} w_B(x,y,z)\,dz}{\left[\frac{\int_{z_a}^{z_b} d_B(x,y,z)\,dz}{z_b - z_a}\right]} \ldots \varepsilon_0 \varepsilon_n \frac{\int_{z_{n-1}}^{z_n} w_B(x,y,z)\,dz}{\left[\frac{\int_{z_{n-1}}^{z_n} d_B(x,y,z)\,dz}{z_n - z_{n-1}}\right]}$$

$$C_N = \varepsilon_0 \varepsilon_a \frac{\int_0^{z_a} w_N(x,y,z)\,dz}{\left[\frac{\int_0^{z_a} d_N(x,y,z)\,dz}{z_a}\right]} +$$

$$\varepsilon_0 \varepsilon_b \frac{\int_{z_a}^{z_b} w_N(x,y,z)\,dz}{\left[\frac{\int_{z_a}^{z_b} d_N(x,y,z)\,dz}{z_b - z_a}\right]} \ldots \varepsilon_0 \varepsilon_n \frac{\int_{z_{n-1}}^{z_n} w_N(x,y,z)\,dz}{\left[\frac{\int_{z_{n-1}}^{z_n} d_N(x,y,z)\,dz}{z_n - z_{n-1}}\right]}$$

provided the following constraints are true:
N>=n AND($w_A(x,y,z) \neq C^* w_B(x,y,z) \neq \ldots \neq D^* w_N(x,y,z)$ for all real C, D AND/OR $d_A(x,y,z) \neq F^* d_B(x,y,z) \neq \ldots \neq G^* d_N(x,y,z)$ for all real F and G, so that $w_A(x,y,z), w_B(x,y,z), \ldots w_N(x,y,z)$ are independent equations, and $d_A(x,y,z), d_B(x,y,z), d_N(x,y,z)$ are independent equations.

2. The apparatus of claim 1 wherein each of said main capacitive sensors further comprises a pair of opposing conductive plates capable of submersion in said insoluble fluids.

3. The apparatus of claim 2 wherein said pair of conductive plates are in substantially vertical alignment.

4. The apparatus of claim 2 wherein each of said conductive plates is constructed of an electrically conductive metal or material.

5. The apparatus of claim 2 wherein each of said conductive plates further comprises a rigid, non-conductive substrate.

6. The apparatus of claim 5 further comprising an insulator at least partially covering said substrate and said conductive plate.

7. The apparatus of claim 2 wherein the distance between said pair of conductive plates differs or the width of each of said pair of conductive plates is distinct in each of said main capacitive sensors.

8. The apparatus of claim 1 wherein said main capacitive sensors are an array of main capacitive sensors having an array of conductive plates.

9. The apparatus of claim 1 further comprising electrical circuitry for determining the capacitance of each of said main capacitive sensors.

10. The apparatus of claim 1 further comprising at least one reference sensor.

11. A method for measuring discrete heights of at least two insoluble fluids in a vessel, said method comprising the steps of:
   (a) determining the capacitance of at least two main capacitive sensors, wherein each of said main capacitive sensors comprises at least one pair of opposing conductive plates in said insoluble fluids, wherein the geometries of said pair of conductive plates are distinct between each of said main capacitive sensors; and
   (b) determining whether the capacitance of a reference sensor is changing over a time frame, if said capacitance changes beyond a threshold capacitance value, concluding said reference sensor is on a fluid interface;
   (c) determining whether a dielectric value from said reference sensor for each of said insoluble fluids is outside an acceptable range of dielectric values for any of said insoluble fluids, if said derived dielectric value is outside said range of dielectric values, concluding said reference sensor is on a fluid interface and/or said derived dielectric value is erroneous; and
   (d) determining the discrete height of each of said insoluble fluids utilizing said capacitance and said geometries of said main capacitive sensors and said derived dielectric value of said reference plate.

12. The method of claim 11 wherein said insoluble fluids are selected from the group consisting of crude oil and water, milk and cream or fresh water and brine, inorganic and organic fluids, or polar and non-polar fluids.

13. The method of claim 11 wherein at least one of said insoluble fluids includes air.

14. The method of claim 13 wherein said main capacitive sensors that measure the insoluble fluids that are not air have differing, distinct geometries.

15. The method of claim 11 wherein said step of determining said capacitance of said main capacitive sensors further comprises the steps of:
   charging each of said main capacitive sensors to a precise voltage;
   taking a first time measurement from said charging of said main capacitive sensors;
   allowing said charges of said main capacitive sensors to dissipate through a resistor at a known rate;
   taking a second time measurement when said voltages of said main capacitive sensors cross a known threshold; and
   deriving said capacitances of said main capacitive sensors from the difference in said first time measurement and said second time measurement.

16. The method of claim 11 wherein said step of determining said discrete height of each of said insoluble fluids is derived from numerical solutions to the following equations:

$$C_A = \frac{1}{d}\left\{\varepsilon_a z_a\left[\frac{z_a(w_{top} - w_{bottom})}{2h} + w_{bottom}\right] + \varepsilon_b(z_b - z_a)\left[\frac{(z_b + z_a)(w_{top} - w_{bottom})}{2h} + w_{bottom}\right] + \varepsilon_{air}(h - z_b)\left[\frac{(h + z_b)(w_{top} - w_{bottom})}{2h} + w_{bottom}\right]\right\}$$

$$C_B = \frac{1}{d}\left\{\varepsilon_a z_a\left[\frac{z_a(w_{bottom} - w_{top})}{2h} + w_{top}\right] + \varepsilon_b(z_b - z_a)\left[\frac{(z_b + z_a)(w_{bottom} - w_{top})}{2h} + w_{top}\right] + \varepsilon_{air}(h - z_b)\left[\frac{(h + z_b)(w_{bottom} - w_{top})}{2h} + w_{top}\right]\right\}$$

or $$C_A = \frac{w}{d}(x_a \varepsilon_a + (x_b - x_a)\varepsilon_b + (h - x_b)\varepsilon_{AIR})$$

$$C_B = w\left\{\frac{x_a \varepsilon_a}{\frac{x_a(d_{top} - d_{bottom})}{2h} + d_{bottom}} + \frac{(x_b - x_a)\varepsilon_b}{\frac{(x_b + x_a)(d_{top} - d_{bottom})}{2h} + d_{bottom}} + \frac{(h - x_b)\varepsilon_{AIR}}{\frac{(h + x_b)(d_{top} - d_{bottom})}{2h} + d_{bottom}}\right\}$$

or $$C_A = \frac{w}{d}(z_a + \varepsilon_a + (z_b - z_a)\varepsilon_b + (h - z_b)\varepsilon_{AIR})$$

$$C_B = w\left(\frac{z_a \varepsilon_a}{\frac{z_a(d_{top} - d_{bottom})}{2h} + d_{bottom}} + \frac{(z_b - z_a)\varepsilon_b}{\frac{(z_b + z_a)(d_{top} - d_{bottom})}{2h} + d_{bottom}} + \frac{(h - z_b)\varepsilon_{AIR}}{\frac{(h + z_b)(d_{top} - d_{bottom})}{2h} + d_{bottom}}\right).$$

17. The method of claim 16 further comprising the steps of:
   if said main capacitive sensors show movement of said insoluble fluids and if said capacitive value of said reference sensor is not changing over said time frame, assuming said reference sensor is fully submerged exclusively in one of said insoluble fluids; and
   disregarding said derived dielectric value at said reference sensor in said dielectric constant value represented by $\in$ in said equations of claim 16:
      if said derived dielectric value falls outside an acceptable range of dielectrics for any of said insoluble fluids;
      if erroneous data is gathered such that said reference sensor appears to be in a fluid that is more dense yet above a less dense fluid; or
      if said derived dielectric value at said reference sensor is changing when neither the temperature of said insoluble fluids nor said capacitance of said main capacitive sensors are changing.

18. The method of claim 16 further comprising the step of:
   if said reference sensor is not on a fluid interface and/or said derived dielectric value is not erroneous, replacing the dielectric constant value represented by $\in$ in the equations of claim 16 with said derived dielectric value when performing said step of determining said discrete height of each of said insoluble fluids.

19. The method of claim 11 wherein said geometries of said conductive plates satisfy the following equation:

$$C_A = \varepsilon_0 \varepsilon_a \frac{\int_0^{z_a} w_A(x,y,z)\,dz}{\left[\frac{\int_0^{z_a} d_A(x,y,z)\,dz}{z_a}\right]} +$$

$$\varepsilon_0 \varepsilon_b \frac{\int_{z_a}^{z_b} w_A(x,y,z)\,dz}{\left[\frac{\int_{z_a}^{z_b} d_A(x,y,z)\,dz}{z_b - z_a}\right]} \cdots \varepsilon_0 \varepsilon_n \frac{\int_{z_{n-1}}^{z_n} w_A(x,y,z)\,dz}{\left[\frac{\int_{z_{n-1}}^{z_n} d_A(x,y,z)\,dz}{z_n - z_{n-1}}\right]}$$

$$C_B = \varepsilon_0 \varepsilon_a \frac{\int_0^{z_a} w_B(x,y,z)\,dz}{\left[\frac{\int_0^{z_a} d_B(x,y,z)\,dz}{z_a}\right]} +$$

$$\varepsilon_0 \varepsilon_b \frac{\int_{z_a}^{z_b} w_B(x,y,z)\,dz}{\left[\frac{\int_{z_a}^{z_b} d_B(x,y,z)\,dz}{z_b - z_a}\right]} \cdots \varepsilon_0 \varepsilon_n \frac{\int_{z_{n-1}}^{z_n} w_B(x,y,z)\,dz}{\left[\frac{\int_{z_{n-1}}^{z_n} d_B(x,y,z)\,dz}{z_n - z_{n-1}}\right]}$$

-continued $$C_N = \varepsilon_0 \varepsilon_a \frac{\int_0^{z_a} w_N(x,y,z)\,dz}{\left[\frac{\int_0^{z_a} d_N(x,y,z)\,dz}{z_a}\right]} +$$

$$\varepsilon_0 \varepsilon_b \frac{\int_{z_a}^{z_b} w_N(x,y,z)\,dz}{\left[\frac{\int_{z_a}^{z_b} d_N(x,y,z)\,dz}{z_b - z_a}\right]} \cdots \varepsilon_0 \varepsilon_n \frac{\int_{z_{n-1}}^{z_n} w_N(x,y,z)\,dz}{\left[\frac{\int_{z_{n-1}}^{z_n} d_N(x,y,z)\,dz}{z_n - z_{n-1}}\right]}$$

provided the following constraints are true:

$N >= n$ AND $(w_A(x,y,z) \neq C^* w_B(x,y,z) \neq \ldots \neq D^* w_N(x,y,z)$ for all real C, D AND/OR $d_A(x,y,z) \neq F^* d_B(x,y,z) \neq \ldots \neq G^* d_N(x,y,z)$ for all real F and G, so that $w_A(x,y,z), w_B(x,y,z), \ldots w_N(x,y,z)$ are independent equations, and $d_A(x,y,z), d_B(x,y,z), \ldots d_N(x,y,z)$ are independent equations.

\* \* \* \* \*